(12) United States Patent
Pansier et al.

(10) Patent No.: US 6,254,521 B1
(45) Date of Patent: Jul. 3, 2001

(54) APPARATUS FOR MANUFACTURE OF A PLASTIC BAG WITH STANDUP BOTTOM WALL

(75) Inventors: Donald J. Pansier, Green Bay; Troy D. Konitzer, Abrams; Peter J. Claybaker; Michael P. Ireton, both of Green Bay, all of WI (US); Robert Dematteis, Grass Valley, CA (US); Giles R. Blaser, Green Bay, WI (US)

(73) Assignee: Amplas, Inc., Green Bay, WI (US)

( * ) Notice: Subject to any disclaimer, the term of this patent is extended or adjusted under 35 U.S.C. 154(b) by 0 days.

(21) Appl. No.: 09/312,513

(22) Filed: May 14, 1999

(51) Int. Cl.[7] ........................................................ B31B 1/14
(52) U.S. Cl. .......................... 493/341; 493/194; 493/203
(58) Field of Search .................................. 493/341, 188, 493/194, 195, 196, 197, 198, 203

(56) References Cited

U.S. PATENT DOCUMENTS

| | | | |
|---|---|---|---|
| 3,380,646 | * | 4/1968 | Doyen et al. ............................. 229/62 |
| 4,054,074 | * | 10/1977 | Martensson et al. .................... 83/622 |
| 4,181,069 | * | 1/1980 | Porter ..................................... 93/35 R |
| 4,986,804 | * | 1/1991 | Jensen ................................... 493/193 |
| 5,015,223 | * | 5/1991 | Boeckmann et al. ................. 493/194 |
| 5,181,365 | * | 1/1993 | Garvey et al. .......................... 53/455 |
| 5,210,993 | * | 5/1993 | Van Boxtel ............................. 43/455 |
| 5,226,858 | * | 7/1993 | Snowdon ............................... 493/195 |
| 5,273,362 | * | 12/1993 | Buchanan ............................. 493/199 |
| 5,273,514 | * | 12/1993 | Kristensen ........................... 493/224 |
| 5,545,117 | * | 8/1996 | Sakamoto et al. .................... 493/203 |
| 5,833,107 | * | 11/1998 | Terranova et al. ..................... 493/11 |
| 6,030,329 | * | 2/2000 | Chen ..................................... 493/197 |
| 6,095,687 | * | 8/2000 | Dematteis ............................ 383/104 |
| 6,171,226 | * | 1/2001 | Dematteis et al. ................... 383/104 |

\* cited by examiner

*Primary Examiner*—Peter Vo
*Assistant Examiner*—John Paradiso
(74) *Attorney, Agent, or Firm*—Andrus, Sceales, Starke & Sawall

(57) ABSTRACT

A flat plastic bag is formed from a side gusseted tubular web. The bag is formed with an open end and a opposite spaced end seal. Hinge crease patterns are formed in each of the gusseted portions at the bottom end of the bag. The pattern includes a two ridge upper leg and a three ridge bottom leg which are formed by a cold sealing process. A bag making machine includes a web supply which is passed through a web feed supply section to form the gusseted web. The gusseted web is sent through a forming section. The segment is first formed with the patterns of two bags in immediately adjacent relationship and located to the opposite sides of a common line defining the end of the adjacent bags. The web is formed into two bag segments with the creases located at each of the segment ends. The web is passed through a unit creating the seal and simultaneously severing the upstream segment. The segments are stacked on a table with each stack sequentially transferred to a punch unit which severs the center portion of the segment to define open bag ends adjacent each other with interconnections to maintain the stack relationship between the separated bags. The formed stack is passed through a separation unit which removes the cut portions thereby separating the bags for transport to a conveyor. The bag may be formed with ventilation openings at the punch unit. The crease pattern with the bottom portion includes a plurality of creases to ensure the proper location of at least one crease within the gusseted portion to ensure easy opening of the plastic bag.

22 Claims, 20 Drawing Sheets

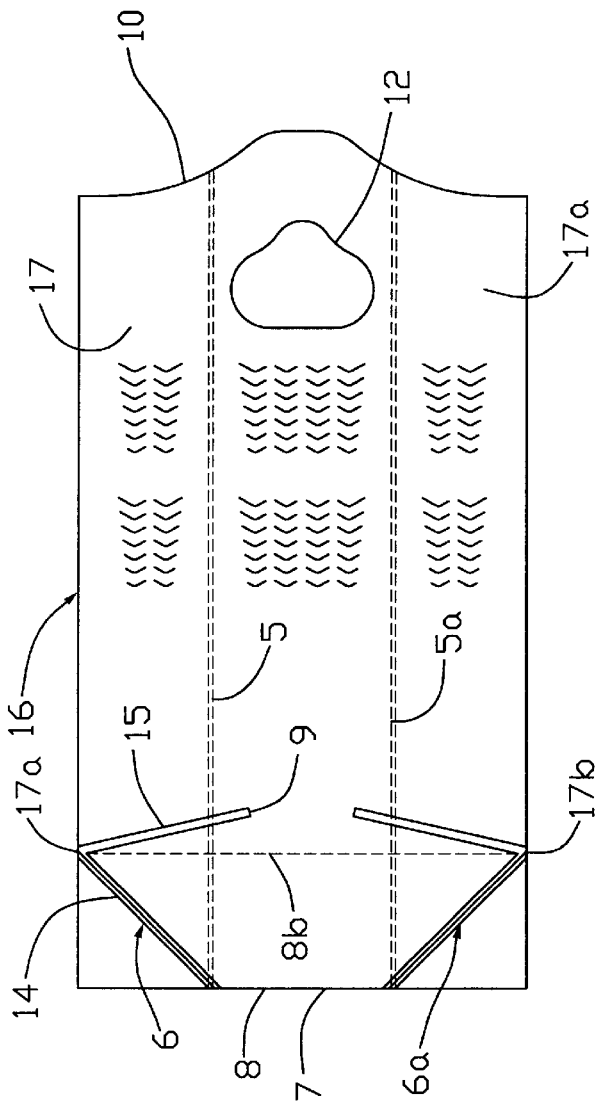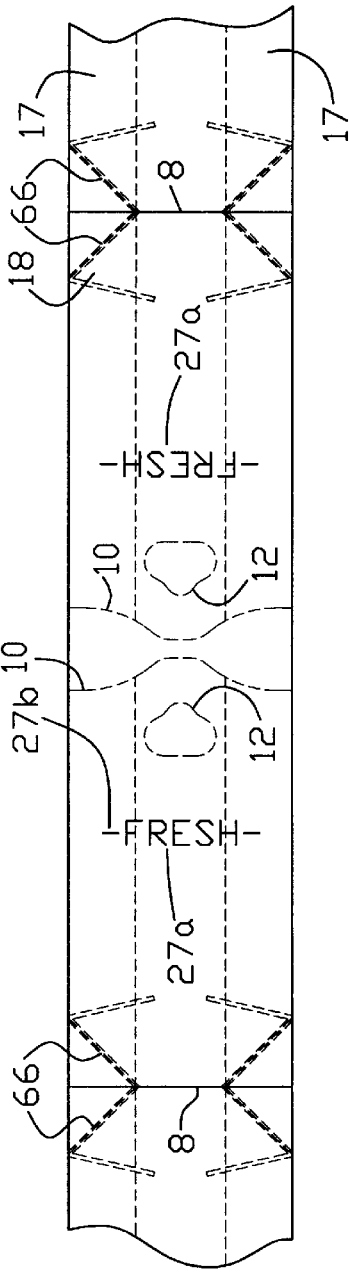

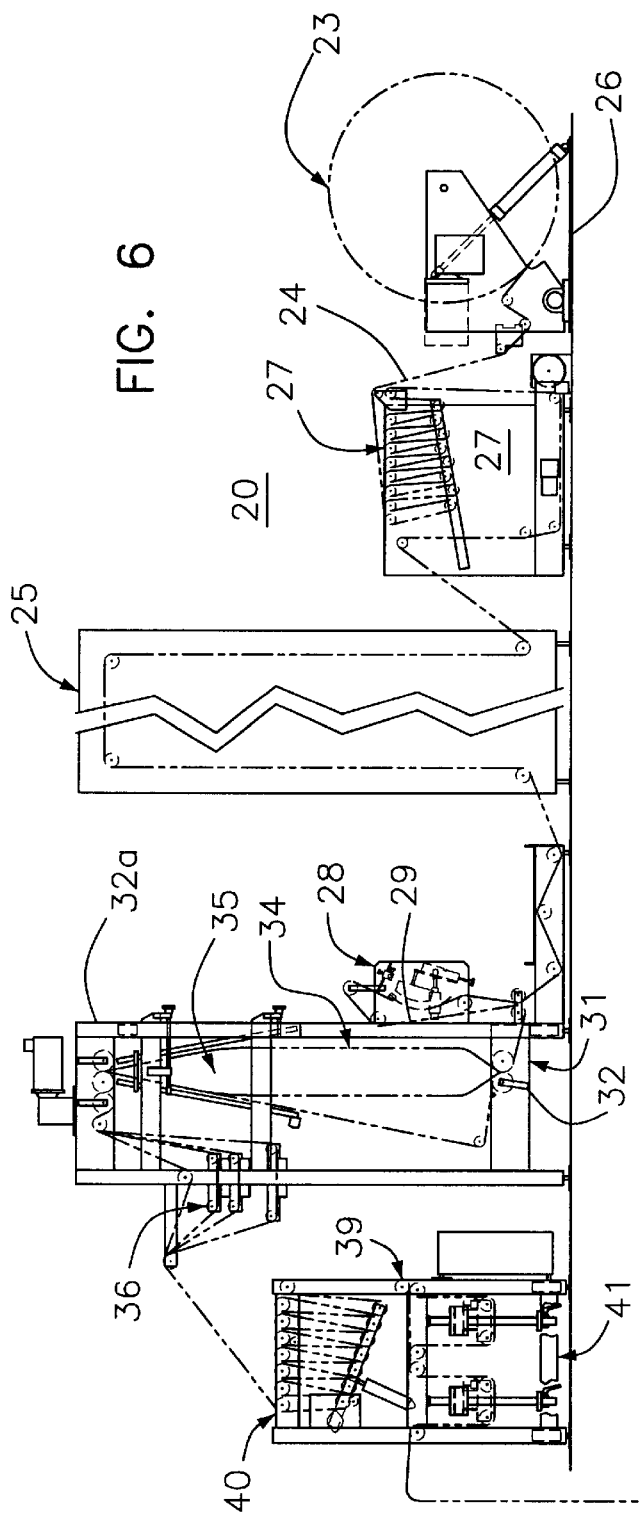
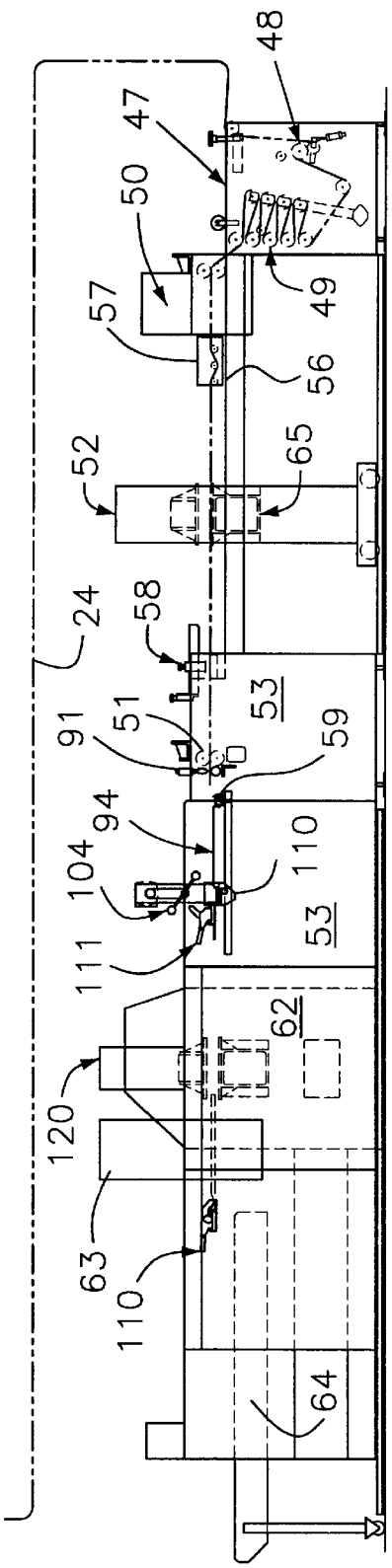
FIG. 6
FIG. 6a

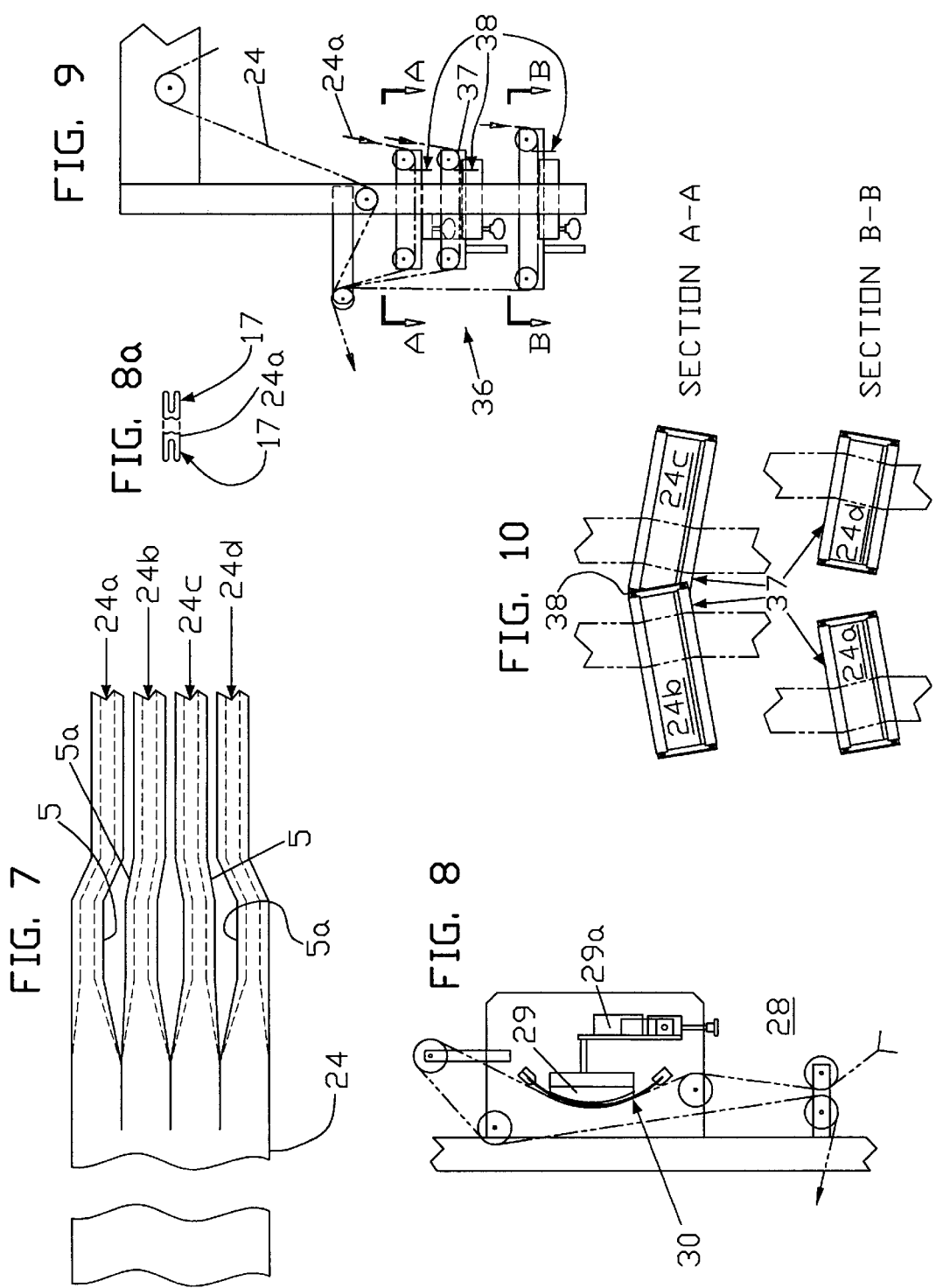

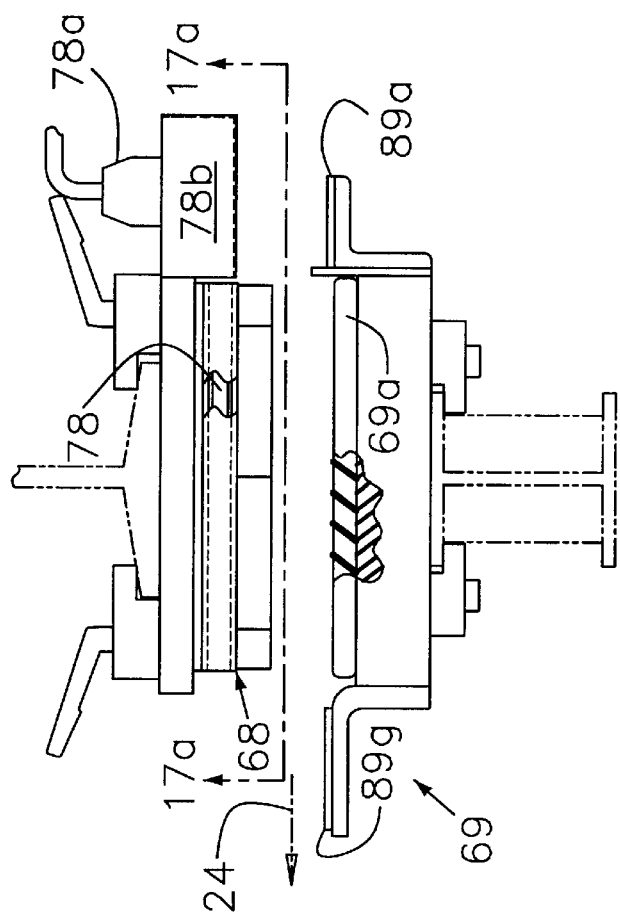
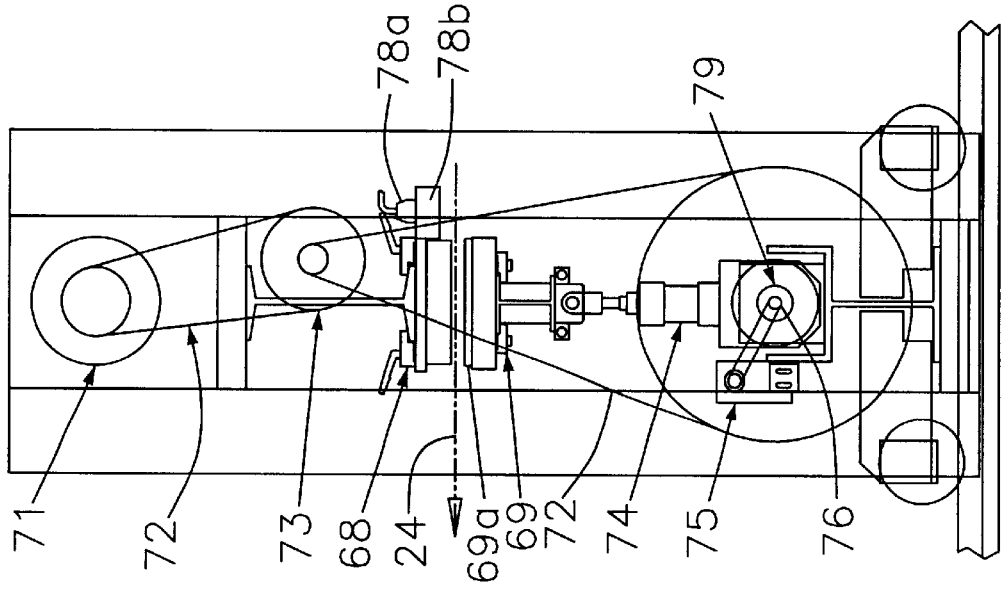

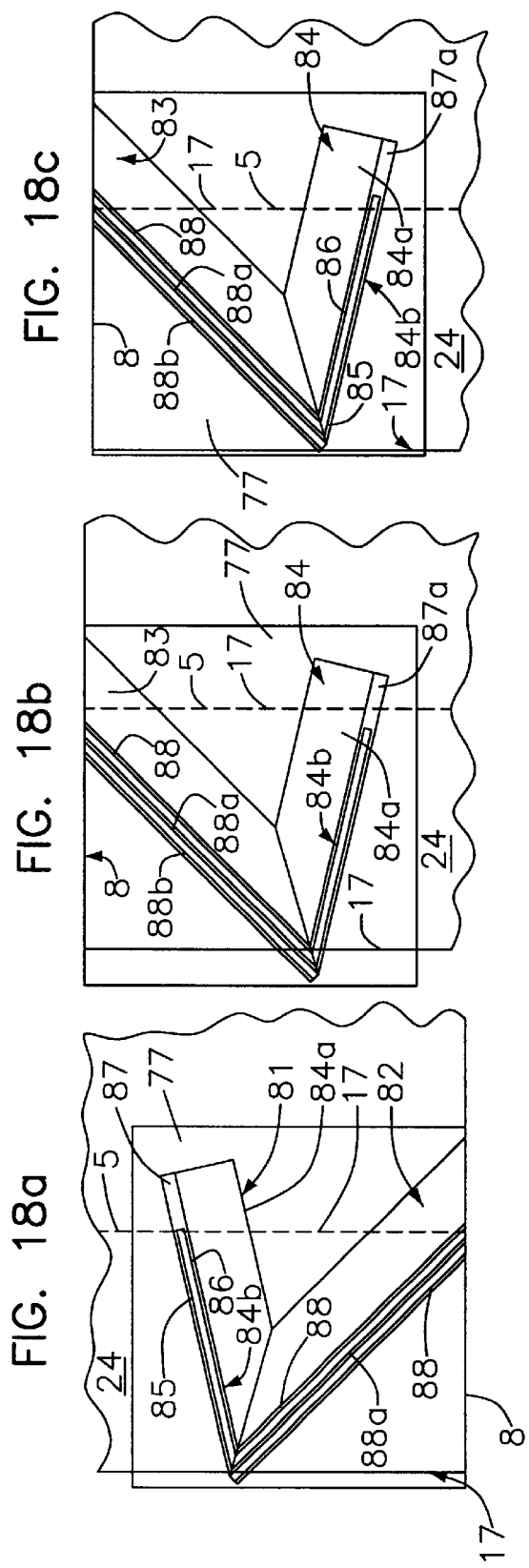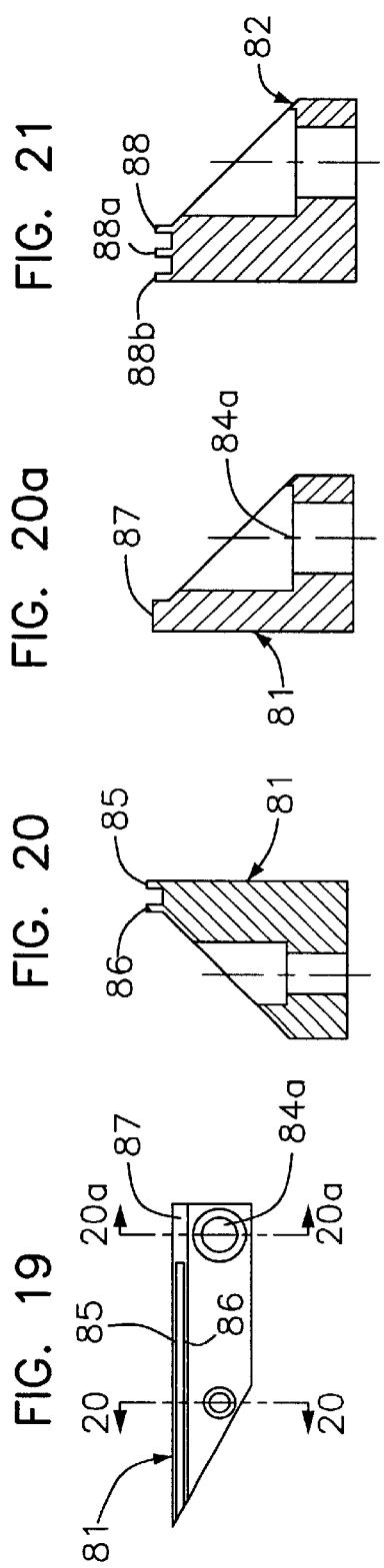

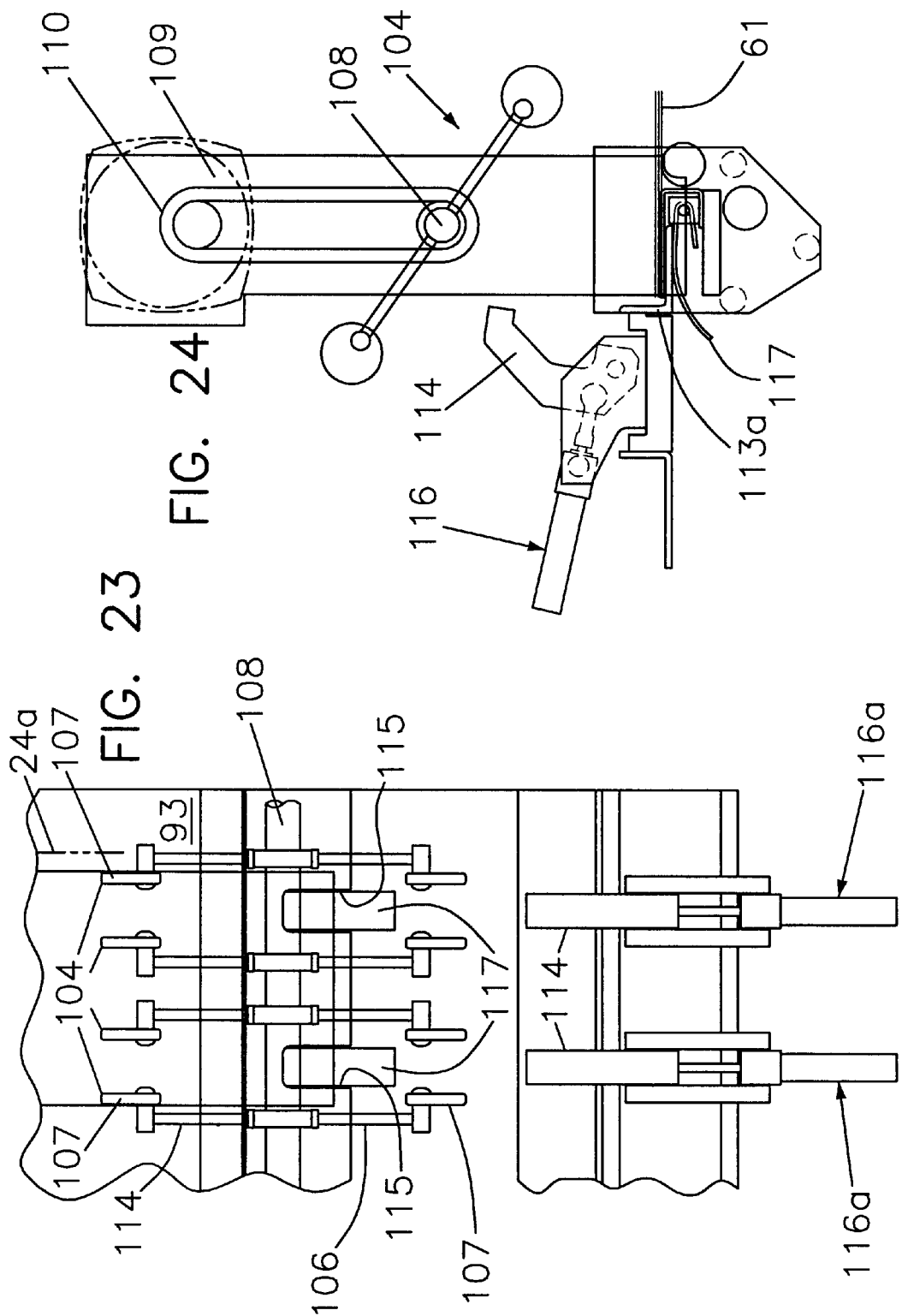

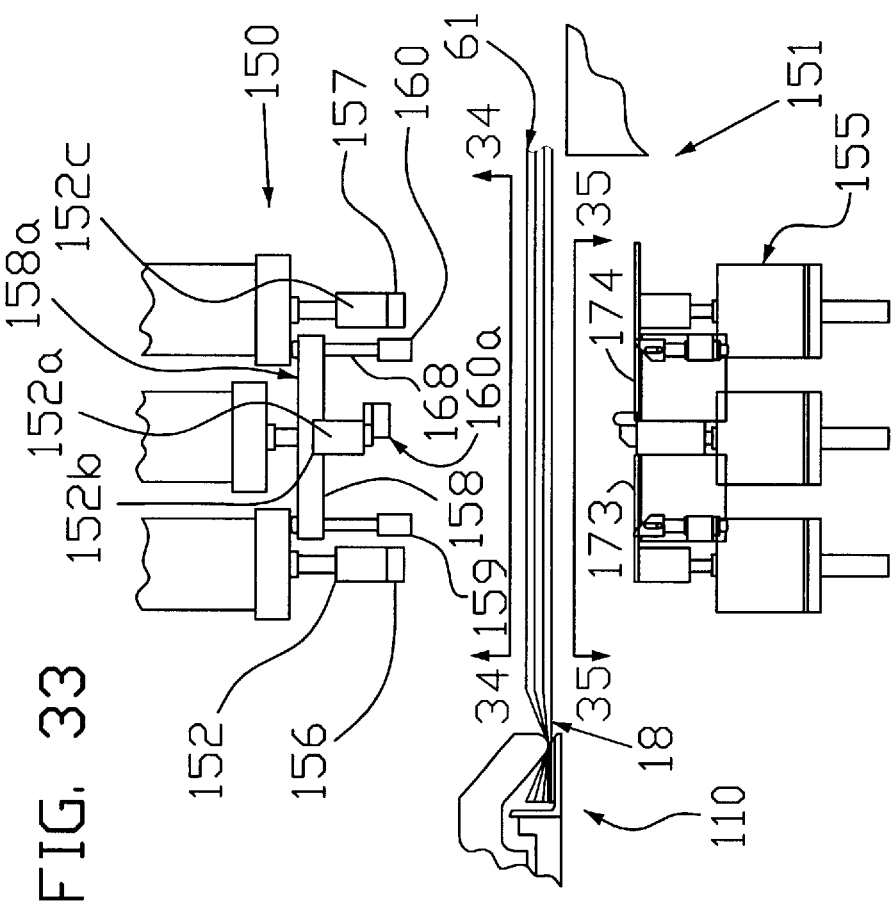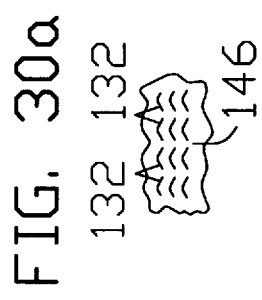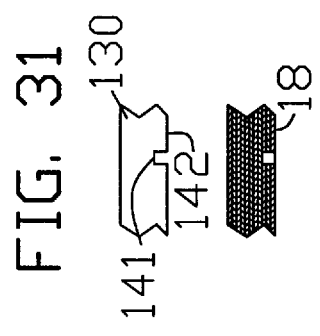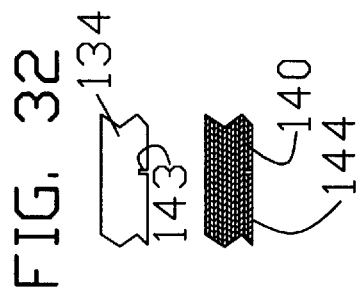

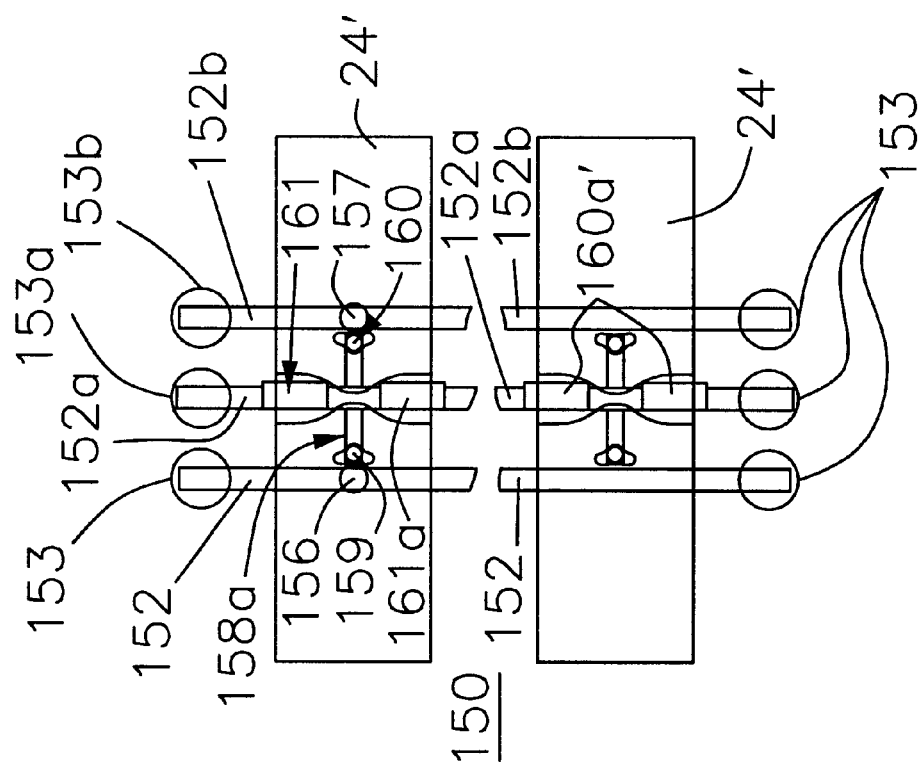

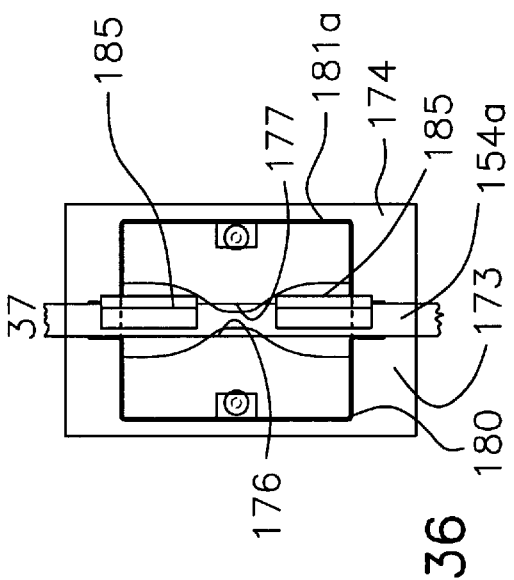
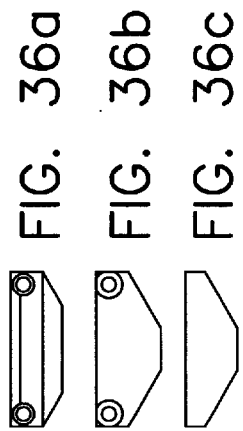
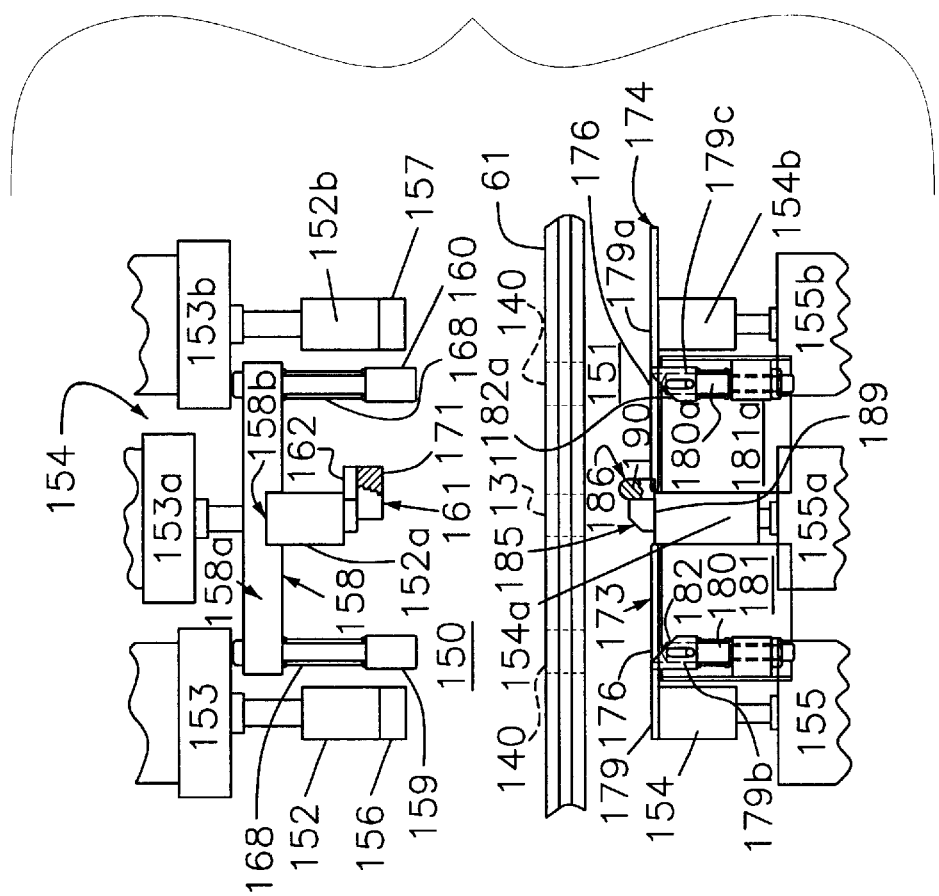

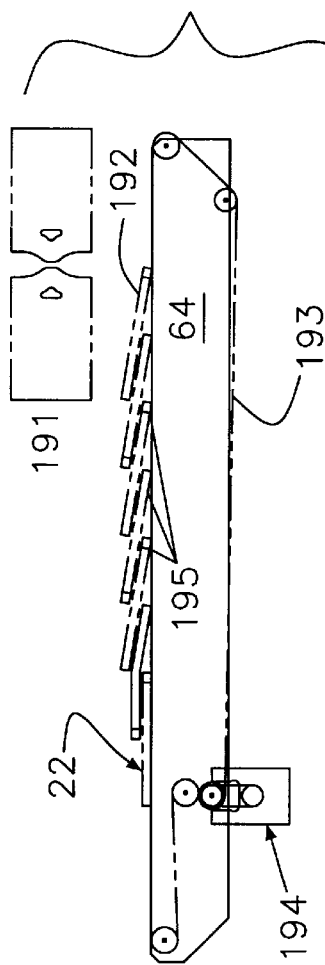
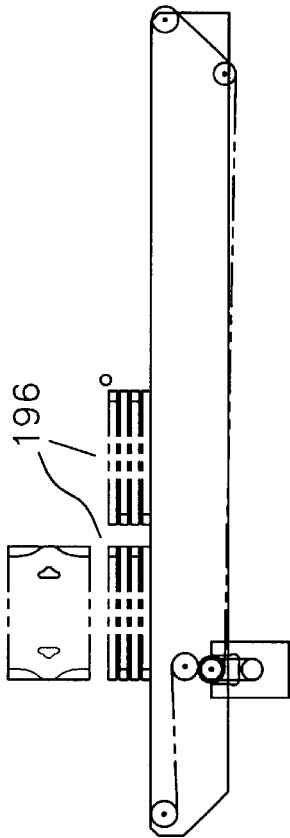
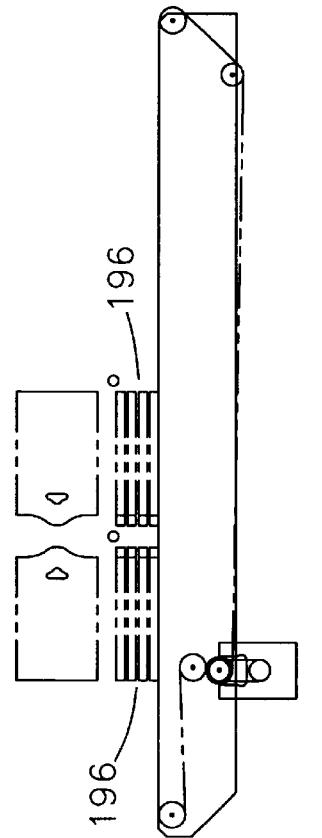
FIG. 42
FIG. 43
FIG. 44

APPARATUS FOR MANUFACTURE OF A PLASTIC BAG WITH STANDUP BOTTOM WALL

BACKGROUND OF THE INVENTION

The present invention relates to a method and apparatus for the manufacture of plastic storage containers and particularly folded flat plastic bags with an integrated formed standup bottom wall structure to provide a stand up plastic bag.

Common plastic bags are widely used in the packaging of products at the point of sale. The weight of the plastic and the construction will vary somewhat with the particular application, and particularly dependent upon the required strength of the bag. Such bags are used as an alternative to paper bags which are also folded members and specially formed with a bottom structure which, when the bag is opened, permits the direct standing of the paper bag to receive the product.

Plastic bags which will stand have not generally been available, particularly at a competitive cost. The assignee of this application is an owner of various pending patent applications disclosing a plastic bag construction which permits a folded flat plastic bag to be opened and with a substantially flat bottom wall permitting direct standup of the plastic bag. This latter bag has distinct advantages over the prior plastic bags which require the user to spend time to open the plastic bag and furthermore to place a product in the bag in order to even begin to provide a standup plastic bag construction.

As set forth in the following series of copending patent applications which included provisional applications and subsequent application and disclose various prior art and background information for this application.

| | Ser. No. | Filing Date | Inventor | Title |
|---|---|---|---|---|
| 1. | 60/088,613 | 06-09-98 | Robert DeMatteis | Plastic Film Hinging |
| | 09/257,345 | 02-25-99 | Robert DeMatteis | Plastic Film Hinging Precreasing Process |
| 2. | 60/088,612 | 06-09-98 | Robert DeMatteis Donald Pansier | Cold Sealing of Plastic Film |
| | 09/257,848 | 02-25-99 | Robert DeMatteis | Apparatus and Process for Cold Seal in Plastic Bags |
| 3. | 60/089,582 | 06-17-98 | Robert DeMatteis | Plastic Bag Bundling System |
| | 09/258,010 (now U.S. Pat. No. 6,171,226 | 02-25-99 | Robert DeMatteis | Plastic Bag Bundling System |
| 4. | 60/089,583 | 06-17-90 | Donald Pansier Robert DeMatteis | Automatic Ventilating System For Intake Bags |
| | 09/258,033 | 02-25-99 | Robert DeMatteis | Automatic Ventilating System For Intake Bags |
| 5. | 60/092,232 | 07-09-98 | Robert DeMatteis Donald Pansier | Plastic Bag Manufacturing Process |
| | 09/257,843 | 02-25-99 | Robert DeMatteis Donald Pansier | Plastic Bag Manufacturing Process |
| 6. | 60/092,233 | 07-09-98 | Robert DeMatteis Donald Pansier | Plastic Film Rigidity Means |
| | 09/258,015 | 02-25-99 | Robert DeMatteis Donald Pansier | Plastic Film Rigidity Means |

-continued

| | Ser. No. | Filing Date | Inventor | Title |
|---|---|---|---|---|
| 7. | 09/257,361 (now U.S. Pat. No. 6,095,687 | 02-25-99 | Robert DeMatteis | Flat Bottom Plastic Bag |

The applications when referenced herein are identified by the above numbers.

The above applications disclose various plastic bag structures, including one prior art patent disclosure of such bag with a flat bottom wall. Generally, the prior art plastic bag is considered complex to manufacture and still cumbersome in use.

The above referenced applications further disclose forming of a new plastic bag with a flat bottom wall by providing a hinge line pattern within the bag sides adjacent the bottom wall portion of a flat gusseted tubular plastic member. The unique bags which are disclosed in the above applications are generally formed with a top opening having a handle structure permitting the support of a stack of the bags for easy access and top opening. The bag may be opened rather easily by various methods. Thus, the one side of the bag opening may be grasped at the top and the bag snapped to provide the opening of the bag and the forming of the flat bottom wall. Merely reaching into the bag may also be applied to create the lay flat bottom wall condition.

Bag making machines are available for high speed production of the prior art plastic bags usually from flat folded or tubular plastic stock available in large rolls. The plastic stock is removed in its flat form and passed through the bag machine where it is cut and sealed to define a flat, open ended bag. The bags are normally formed in stacks and suitably packaged for marketing. The top opening may be shaped with a handle configuration with bags assembled in a stack. The stack may be joined along the upper edge or portion holding the stack together for subsequent handling. The stack may be supported on a hanger from which the merchant or purchaser can readily remove the outermost bag for inserting of product or products. As noted above, the prior art plastic bag which forms a relatively flat bottom wall has presented significant difficulty, and resulted in a relatively high cost bag.

The bag structure as disclosed in the copending application(s) provide a construction, which the present inventors recognized, is adapted to modification of the technology of known bag making processes. Existing modern high speed bag making machinery and technology provides a flat bag stock in tubular form and preferably of a width equal to the width of a plurality of bags. In the latter system, a wide web stock is severed and sealed along the length of the web stock to develop separate tubular bag lanes or lines which are then processed by appropriate sealing of the cut side edges to form individual tubular stock.

Other systems use a folded web with an open edge to form the opening to the bags and with the sides formed by side seams in the folded web.

The new design of the plastic bag with the hinged bottom wall structure requires special adaptation of the bag making technology to maintain a desired high speed and thereby low cost production of the new design. The hinge portion of the specially formed square bottom walls require accurate formation of a hinge within the folded web stock for forming of the bag and preferably with essentially minute seal lines in the bottom wall structure, and preferably sufficient to avoid interference with or requiring special handling to open the bag with the bottom formed as a direct flat supporting wall.

SUMMARY OF THE PRESENT INVENTION

The present invention discloses a process and machine including modern technology to process a layered plastic web into a bag with the appropriate hinge structure to allow the subsequent convenient opening of the bag with the desired flat bottom wall. Generally, in accordance with the present invention, a tubular or folded stock is passed through a series of stations to form the necessary seals, preferably without significant internal/external projections of web material, thereby maintaining a substantially continuous planar plastic side and bottom wall structure upon the opening of the bag, within which the hinge pattern is formed, particularly in the bottom wall structure.

Generally, in accordance with a preferred construction of the present invention, the bag machine is generally constructed in accordance with bag forming machines heretofore manufactured and sold by the assignee. The machine has a web supply section including a support for a tubular plastic stock roll, such as a flattened tube stock having a width corresponding to one or to a plurality of bag widths. In the latter, a cut and seal unit generates thin edge seals to maintain the essentially continuous plastic film at the opposite side edges of the cut width, and form individual lines or lanes for a plurality of bag orientation. The individual tubular web stock in each lane is then side gusseted along the sides. The gusseted individual webs are then moved inwardly to reduce the overall width of the bag making machinery downstream from the gusseted individual lines and passed into a bag forming section within which the webs of each lane move through a series of bag forming stations in cyclical sequence.

In a preferred construction, a seal and cut unit divides the web in each lane into like bag segments, preferably into dual bag segments, with the opposite ends of each segment forming a bag bottom and the center forming the area within which the open ends of the bags are made. The bag segments are then processed to form stacks of bags from each segment.

In a preferred machine, the connected bag segments are first placed in a hinge or creasing station. The bottom locations within the web for adjacent bag segments are formed, each with a plurality of angular and lateral superimposed creases formed within each layer of the plastic web without joining the film layers, but preferably establishing a cold seal or connection. The gusseted web is guided into the creaser unit with suitable guide means such as opposed fingers to the opposite sides of the web. Each finger projects inwardly into the gusset and guides the web or film through the creasing unit at the creasing station. The cold seal forms a readily separated surface cohesion or connection between the film layers, which is readily separated with the complete integration of the individual form layers. The cold seal of the plastic layer although readily separated it is desirable to provide a system for separating of the opposed gussets in each side of the web. The separation of the creases in this area have been found desirable to promote and provide a rapid and effective optimal opening of the bag. Suitable finger members can again be located within the gusset as the web moves from the creasing station to provide a positive separation of the creases within the side gussets. The above structure is considered of significance in the high speed production of the bag with assurance the effective bag opening and providing direct standing in place. The web with the adjacent crease pattern is then transferred or stepped into a web cut and seal unit where the end of the dual bag segment is sealed and cut on the junction of the hinge patterns to separate the dual bag segment from the web. The cut and seal unit is constructed to produce a flap-less joint, essentially equal to the preferred side edge seals produced in forming the individual lines. The desired seal is readily formed with the known but otherwise used side weld units. In this manner, each dual bag segment includes the bottom ends, as well as the side walls, formed with the essentially flap-less wall structure.

The separated dual bag segments are sequentially transferred to a stacking station where a plurality of dual bag segments are stacked to a desired height or number of like segments. In high speed production, the web segment as transferred from the cut and seal unit. Particularly with the preferred cut and seal unit, the upstream end of the bag segment may often be in a heated state where if placed on a prior bag segment the seal ends may bond together. The present invention provides a bag stacking system to prevent actual bonding of bag segments to each other, which would prevent subsequent separation in normal application. The downstream end of the bag stack is preferably flattened for subsequent transfer through the final stage of the lane.

In a preferred stacking system, the bags are stacked preferably on stacking needles, with the upstream ends in superimposed relation. The just heated and cut upstream bag end is allowed to move into the stacking unit which holds the immediately adjacent bag segments momentarily separated for a necessary period during the operation of the cut and seal unit on the next segment. In a practical application, the upstream end of the bag segment with the hot seal is allowed to drape over the stacking table or other support, with a movable element holding the adjacent hot seal ends separated to permit sufficient cooling to prevent bonding within the stack.

The stack of dual bag segments are then transferred by a separate conveyor into a bag forming or severing unit such as a punch unit to partially sever the bags along the central portion thereof to form two like individual bags in each segment, with the desired open ends. The punch unit shapes the open ends of the bags in any desired pattern with a scrap or slug formed between and thereby forming the open ends. The punch unit also preferably provides partial and spaced small interconnections or tie strips between the dual bag stacks and the slug to firmly but releasably tie the formed bag stacks together in each segment stack, but in such a manner as to allow the later convenient separation of the two formed bag stacks from each other. The punch unit further forms the handle opening and vents, where specified. The scrap or slug of the bag openings within the stack are preferably also provided with one or more tie strips between the bags within the stack. Both slugs of the open ends and the handle openings are preferably also connected by a cold punch process for removal as a unit. The vent openings are also provided with laterally spaced openings, particularly where substantial lines of vent openings are provided. The latter construction will maintain a strong bag while venting of air and fumes from within the bag.

The tie strip interconnections are readily provided by forming partial notches in the punch blades which severs through the bag segment stacks, except at the notches. The notches are preferably only a small depth within the edges, with smaller notches in the openings within the bag handle of the bags. A cold seal member or other system may press the handle slugs and the finger opening scrap or slugs to produce a partial attachment for subsequent movement of the segment stack and removal of the scrap or slugs.

The stack of the formed bag segments are then transferred to a separation unit which includes a slug removal unit. The separation unit includes a structure to clamp the stack of bag segments in place and a removal tool to engage and separate the waste or slug portions from the dual bag segment stack, thereby creating two separate bag stacks on-line with the two adjacent bag stacks oriented in opposite directions. The handle opening slugs, if present, are also removed. The separated stacks are then moved by a conveyor in sequence to an output conveyor or other receiver and in a shingled arrangement, separate stacks, with like or opposite orientation, or the like.

In a preferred construction, the separation unit includes a top removal section and a lower support section with a waste receiving unit. A plate member with openings corresponding to the waste or forming slugs in the dual bag segments is secured between the top and bottom sections. The top removal section includes elements with spaced clamp members to clamp down on the bag stack outwardly of the bag openings. Three interconnected removal elements are spaced in accordance with the central slug, and the hand opening slugs. The latter removal elements are connected to each other or otherwise operated in coordination to produce removal of each slug. The lower support section includes cooperating clamp elements or members aligned with the upper support elements or members and cooperating waste directing elements or members aligned with the slug removal elements for directing the waste slugs to a waste receiving unit. In the preferred construction, the top and bottom sections are constructed with common cylinder units at the opposite sides of the complete line with cross interconnecting structure between the related cylinders. The separation and support structure of the several lanes are mounted to the cross interconnecting structure.

The total assembly is controlled through a logic control system providing for the timed movement of the web stock and the dual bag segments through the machine in proper sequence to provide for the appropriate sealing, shaping and forming of the bags from the plastic web as well as the stacking and assembly of the bags for subsequent processing.

The upstream web supply end of the system, through the side gussetting of the web stock into a plurality of individual side gussetted tubes is preferably accomplished in a continuous flow with a web take-up dancer, or other means, for accumulating the web during the stepped cyclical operation of the downstream bag forming section. However, the processing of forming of the individual bags from the side gussetted stock requires the stepped sequence through the system.

With the continuous line, the main controller creates the continuous cycles of operation, each cycle including a first movement period of time in which to move the web and bag segments and a second period of time in which the web is not moved and during which the several stations of the bag forming section operate on the bag segments. The operational time period would be set based on the time requirement of the slowest station.

In accordance with the above referenced preferred embodiment, a special draw roll connection is introduced at the mating of the web supply section and the bag forming section to control the feed of the individual two sections into the actual forming of the individual bags and the shaping thereof to the required final product at the output conveyor station or other take out system.

The preferred embodiment provides for forming of bags which may include one or more individual lines or lanes. A significant feature is to insure a side sealed type of a weld to the gussetted portions including the bottom bag portion of each segment to permit the formation of an optimal construction; that is, a bag without a significant flash or flap which projects outwardly and interferes with the forming of the flat bottom wall and desirable stand up of the bag while producing a high strength stand up bag at a competitive cost. This avoidance of a flap or skirt is particularly true in the bottom bag portion in order to maintain and develop a bag which readily stands without necessity of first introducing a product.

The creasing die assembly is a particularly significant feature in that it must provide a very effective crease pattern in each of the layers while preventing any actual sealed interconnection at such points which would interfere with the separation of individual layers within the bag panels and particularly the bottom bag section. In accordance with the preferred embodiment, a special hinge pattern includes hinge lines which are specially formed and in which each hinge line including parallel thinned lines connected by a central portion, and preferably with the film layers adhering to each other by a cold seal line portions. The hinge pattern is preferably a V-shaped pattern located sideways within each gusseted bottom portion of the flat bag and opening from the outer edge of the segment into the central portion of the bag, as generally disclosed in the prior and pending applications filed on Feb. 25, 1999 entitled Plastic Film Hinging And Cold Sealing Plastic Film.

The V-shaped pattern preferably includes a dual line hinged pattern in the upper leg of the V-shaped pattern and a triple crease pattern in the lower leg of the V-shaped pattern which is immediately adjacent to the bottom seal. Triple line crease pattern includes three parallel lines and allows for slight lateral positioning of the web while maintaining at least one crease line in proper location within the gusseted portion for assuring the rapid opening to a flat bottom wall structure. The dual line hinge pattern may have the creases in the adjacent layers relatively loosely connected while the crease lines in the triple crease pattern are preferably more firmly interconnected. Either system provides a highly satisfactory opening bag but the latter system may produce a somewhat more effective system.

In either case the creased bag structure results in a highly practical flat bottom wall bag with a stable flat bottom wall.

The multiple lane bag structure preferably includes reference scale units within the web supply section and at the various stations in the downstream process sections for changing the bag machine for different bag products. A four lane system as hereinafter illustrated may be changed, for example, to produce different sized bags; for example, two or three lanes to produce wider bags. Changes of this type would not only require changes within the upstream forming of the width of the gusseted tubular film in each lane but adjustment of the downstream units for forming of the crease pattern of the dual bag segments, and of course other establishment of appropriate operative lanes for processing the webs.

The preferred bag making machine is a high speed bag making machine employing an apparatus which is specially constructed or modified and joined into a bag making machine to form stacks of individual flat bags with the special creased bottom patterns to readily produce a stand up bag unit with an essentially flat bottom wall.

The preferred bag making machine may readily use modern day control technology to maintain the precise movement of the web stock and the individual formed bag segments and bag stacks through the apparatus to produce a cost effective plastic bag for practical application in the marketplace.

BRIEF DESCRIPTION OF THE DRAWINGS

Various other features, objects and advantages of the invention will be made apparent from the following description taken together with the drawings. The drawings illustrate the best mode presently contemplated of carrying out the invention.

In the drawings:

FIG. 4 illustrates the bag of FIGS. 1–3 as a flat bag member formed as an in-line production of a plurality of such bags;

FIG. 5 illustrates a tubular web with successive dual bag segments for sequentially producing two bags in the preferred embodiment shown in the following figures;

FIG. 6 is a side elevational view of a multiple lane bag machine illustrating a preferred construction for manufacture of the bag of FIGS. 1–5;

FIG. 7 illustrates the web formation in the bag machine shown in FIG. 6;

FIG. 8 is a diagrammatic view of a slit/seal unit for severing a wide tubular web into a plurality of narrow tubular webs as shown in FIG. 7;

FIG. 8a is a cross-section of a gusseted tubular web;

FIGS. 9 and 10 are diagrammatic views of a converger attached to a gusseter for changing the alignment of the webs;

FIG. 16 is an enlarged side elevational view of creasing assembly shown in FIG. 6;

FIG. 17 is an enlarged view of the die assembly shown in FIG. 16;

FIGS. 18a, 18b and 18c illustrates hinge patterns with lateral movement of a web;

FIG. 19 is a enlarged side elevational view of a die member shown in FIG. 18;

FIG. 20 is a cross-section of the die member shown in FIGS. 18 and 19 and taken generally on line 20—20 of FIG. 19;

FIG. 20a is a cross-section of the die member shown in FIGS. 18 and 19 and taken generally on line 20a—20a of FIG. 19;

FIG. 21 is a cross-section of a second die member of FIG. 18 and taken generally on line 21—21 of FIG. 18;

FIG. 23 is a plan view of a portion of FIG. 22;

FIG. 24 is a view with the carriage conveyor located at the bag stacking station for gripping and moving of the bag segment stack;

FIG. 30A is a diagrammatic view illustrating a set of the punch blades for forming a vent opening shown in FIG. 28;

FIG. 31 is a view taken generally on section "A" of FIG. 28 and illustrating the center punch blade and the resulting cutting of the aligned bag stack with a tie area at the bag center;

FIG. 32 is a view taken generally on section "B" of FIG. 28 and similarly illustrating the punch blade and resulting bag separation for the hand openings;

FIG. 33 is a side view of separation assembly for separating of the bags in each stack of segments;

FIG. 34 is a horizontal section taken on line 34—34 of FIG. 33;

FIG. 35 is a horizontal section taken on line 35—35 of FIG. 33;

FIG. 36 is a fragmentary enlarged view of FIG. 33;

FIGS. 36a–36c illustrate the components of the separation unit as shown in FIG. 36;

FIG. 37 is an enlarged view of a support plate shown in FIGS. 34 and 36;

FIGS. 42–44 illustrate an indexed conveyor with the separated bag stacks placed in various orientations.

DETAILED DESCRIPTION OF THE ILLUSTRATED EMBODIMENT

Figure 1:
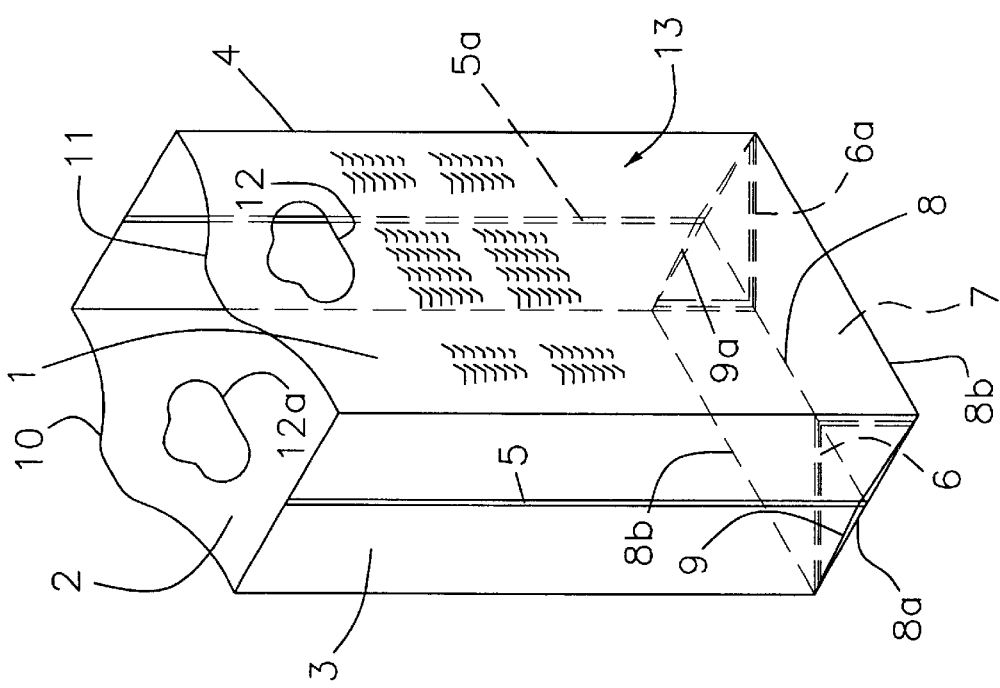
FIG. 1 is a pictorial view of a plastic bag manufactured in accordance with the teaching of the present invention.

Referring to the drawings and particularly to FIG. 1, an open plastic bag is illustrated incorporating an embodiment of the present invention.

The plastic bag is preferably formed of clear or semi-clear polyethylene plastic and may include various printed information thereon. The bag is formed of a relatively thin plastic with the thickness varying with the application, as previously discussed and disclosed. The illustrated bag is typically a rectangular shaped bag having front and back panels 1 and 2 connected by integral side walls or panels 3 and 4.

The panels are shown all generally rectangular. The bag as shown is formed from a multi-layered web segment consisting of a pair of like-abutting layers of plastic film. The illustrated bag is particularly formed from a tubular plastic film, as hereinafter described.

The side panels 3 and 4 are formed as extensions of the front and back panels 1 and 2 and may be joined at the center by seams 5 and 5a. The seams 5 and 5a are specially made to be essentially minute while providing a firm welded junction of the panels, as more fully discussed hereinafter. The side panels in the formation of the bag are gussetted generally on the seam lines 5 and 5a, and like hinge line patterns 6 and 6a are formed within the gussetted side walls, respectively.

Figure 2:
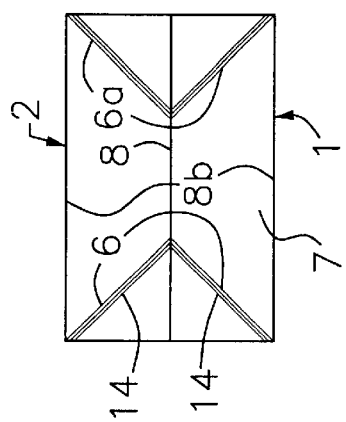
FIG. 2 is a view looking downwardly into the opened bag of FIG. 1.
Figure 3:
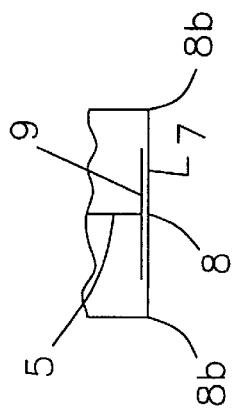
FIG. 3 is a bottom view of the bag illustrated in FIG. 1 with parts broken away to more clearly illustrate detail of construction.

The bottom wall 7 of the bag is formed by the hinged side walls and in accordance with the present invention develops an essentially continuous flat bottom wall which readily supports the bag in an open standing position, shown in FIG. 1. The bottom wall 7 is again formed by equal halves of the web segment with a seal 8 extending across the center portion of the bag as clearly illustrated in FIGS. 1–3. The side portions of bottom wall 7 consists of a bottom panel 8a integral with the side panels 3–4 and with folded overlapping layered portions 9 and 9a of the side panels 3 and 4. As shown most clearly in FIGS. 1–3, the multi-layer panel portions 9 and 9a are essentially identically constructed with a lower portions forming an extension of the bottom wall 7.

Upper handle portions 10 and 11 are developed as an integral part of the respective wall panels 1 and 2.

The illustrated handles project upwardly in a suitable configuration and are shown having finger-like openings 12 and 12a for carrying of the bag and further assistance in opening of the bag. The bags are formed with groups of vent openings 13 for applications requiring the release of heated fumes and air, or the like.

As most clearly shown in FIGS. 1 and 4, the multi-layered bottom portions are the result of special hinge line portions having a generally V-shaped hinge pattern or configuration and defining hinge lines 14 and 15 in portion 6 and 6a for appropriate folding of the bottom plastic wall portion and the adjacent side wall portions to develop the square bag configuration with the square flat bottom wall upon opening of the bag.

The bag is formed as a flat folded member 16, with side gussets 17 in the side and bottom wall portions of the member and 17a as shown in FIG. 4. The panels 1 and 2 abut each other with the gusseted side walls 17 and 17a folded inwardly therebetween. The bottom edge of the flat bag is sealed by the very thin line-like seal 8 along the bottom edge. The V-shaped hinge lines 14 and 15 are formed in the gusseted sides of the bag and project inwardly from the apex to produce identical fold lines within the side walls 3 and 4 of the flat bag. The dotted line 8b across the folded bag, as shown in FIG. 4, which joins the apex 17a and 17b of the hinge patterns 6 and 6a define the outer front and back edges (which are correspondingly numbered 8b) of the flat bottom wall in FIGS. 1, 2 and 3. With the illustrated construction, the flat bag member 16 can be opened in any suitable manner. With appropriate construction, the user can grasp one of the handles 10 or 11 and snap the bag open, with the bottom of the bag automatically unfolding into the essentially square flat bottom structure permitting the setting of the bag directly onto a flat supporting surface, with the bag held in the opened position as a result of the hinging and the bottom walls structure, as shown in FIG. 1.

To establish the optimal construction, the bag is carefully formed with the desired relatively small seals, particularly in the seal 8 of bottom wall 7, so as to prevent any significant downward projection which might tend to interfere with the stand up of the bag. Similarly, the hinge structures 6 and 6a are to be carefully formed in the bottom wall structure to promote the effective opening and orientation of the bottom wall as a flat supporting wall structure.

Further, the bags must be mass produced at a competitive cost relative to conventional paper bag having a flat bottom wall as well as the more conventional plastic bag which will not provide this particular feature.

The bags are preferably formed and assembled in groups or stacks of the flat bags, as shown in FIG. 4.

The bag machine illustrated in FIG. 6 provides for rapid production of the flat bags such as shown in FIGS. 1–4 with the bags arranged in stacks of a predetermined number. In each bag stack, the bags may be interconnected to each other at the upper end such as shown in the cross referenced application No. 3 for convenient handling and preferably hanging of a bag stack for access by the user. This permits the user to remove an outermost bag from the stack, and by snapping or otherwise opening the bag forming the flat bottom wall and positioning the bag on a flat support surface for filling of the bag with appropriate product.

Further, the illustrated bag machine forms the individual bags by forming a dual bag segment 18 within a web as shown in FIG. 5, which has a length equal to two bags, and with the common bag bottom seal 8 at the opposite ends of the dual bag segment and the handles and opening at the center.

A preferred and unique bag forming apparatus is shown in FIGS. 6 and 6a. The illustrated bag forming apparatus includes a web supply section 20 for producing the side gusseted tubular web, a bag forming section 21 downstream of section 20, to provide sequential operation to form and stack the bags at a discharge end of the line. The bag machine section 21 separates the gusseted tubular web into the dual bag segments 18, which are then processed to form the bags into stacks 22 of individual bags at the discharge end of the machine.

More particularly with reference to FIG. 6, the illustrated bag machine includes the system for producing a plurality of bags with the web supply section 20 including a web supply roll 23 of generally tubular web 24, with the complete conversion of the web 24 from the roll to bag stacks 22 at the discharge end of the machine. The web 24 of supply roll 23 is shown having a web width equal to four of the flat bag members. The web supply section 20 consists of generally known systems for forming four individual tubular web 24a, 24b, 24c and 24d from the main web 24.

The web roll 23 is mounted in a conventional motor driven unwind unit 26 and the web 24 is threaded through an offset steering roll, dancer and sensor assembly 27. A printing press 25 may imprint each bag line with various advertising or other information, such as generally shown diagrammatically at 27a in FIG. 5, which a particular customer such as a fast food marketing organization may request. The printing press 25 is of any well known construction to provide like printing upon each bag width 24a, 24b, 24c and 24d.

In both the web supply section 20 and the bag forming section 21, four separate lanes of the same construction correspondingly process each of the four webs into corresponding bags. The structures in a single lane are described in detail, with corresponding primed numbers applied to the additional lane(s) when illustrated.

Immediately downstream of the press unit 25, a slit/seal unit 28 receives the printed web 24. The unit 28 includes three spaced slit/seal knife units or assemblies 29 aligned with the web 24 as received from the press unit 25. Each slit/seal knife assembly severs the web 24 longitudinally to separate the web into four separate lines and immediately seals the opposed slit edges to form the four tubular webs 24a, 24b, 24c and 24d from the single tubular web 24 in a continuous in-line manner. As shown in FIG. 8, assembly 29 includes a heated knife 29a which is positioned adjacent guide plate 30. The knife 29a separates the web 24 longitudinally with the severed edges being fused and welded together, and forming sealed spaced longitudinal seams 5–5a to opposite sides of the knife. The seams 5 and 5a may be formed as a result of the fusion from a small bead. This is desirable in providing rigidity to the sidewall of the bag.

The heated knife 29a is a segmented, curved unit which is offset from the curved plate 30 in the standby position. In the cutting position shown, the plastic web 24 engages the leading knife edge and gradually engages the entire blade, as shown. This results in a preheating of the film web 24 prior to being cut and keeps the web film in longer contact with the knife and plate. This action extends the slit and seal dwell time and allows faster sealing speed. The knife unit 29 is pivotally mounted and supported by an air cylinder 31 for withdrawal from the cut and seal position when the web 24 is not being processed.

A side weld type of a slit/seal unit 28 is used to prevent unwarranted projection of significant plastic seal material from the web and thus maintain an essentially continuous tubular web wall with the minimum projection or bead of the welded material along the seams 5 and 5a providing some rigidity to the sidewall structure. The outer webs 24a and 24d have only an inner welded seam 5, the outer edge being formed by the original web 24.

The four webs 24a, 24b, 24c and 24d are passed through a side gusseter 31 which creates gusseted side walls 17 in each web, as shown substantially enlarged in FIG. 8a. The separate tubular webs are thereby reduced to a smaller width, and particularly correspond to that of the final flat bag as shown in FIGS. 4 and 5.

The gusseter 31 is a known device and includes a motor-driven draw roll assembly including upper and lower nip rolls 32 and 32a to essentially seal the tubular bag therebetween. In practice, a manually operated air nozzle 33 is used by the operator to inflate the tubular web between the nip rolls, as diagrammatically shown at 34. The nozzle 33 is a thin member having a sharp end so as to allow ready insertion into the web, preferably adjacent the upper nip rolls. Once inflated, the tubular web will be continuously inflated between the sealing nip rolls, and of course is subject to monitoring by the operator, with air added as necessary. The inflated web 34 is folded inwardly at opposite sides by gusset boards 35 and collapsed by the collapsing guides in combination with the upper nip rolls 32 to form a flat web with the side gusseted walls 17 and 17a of FIGS. 4 and 5. The location of the individual webs 24a–24d are sensed by any suitable means and caused to move together into the central portion of the machine thereby reducing the necessary width of the line downstream from that point, as shown in FIG. 5.

In the illustrated embodiment, the four webs 24a–24d pass through a known converger 36, shown enlarged in FIGS. 9 and 10. The converger 36 includes separate roller path units 37 for each lane web. The rollers are manually positioned to physically move the four webs closer together, as shown in FIGS. 9 and 10. The roller units are pivoted as at 38 close to the web line where the web enters the roller unit. This results in a reduction in the necessary downstream path and particularly reduces the width of the downstream process section of the bag machine and the necessary floor space.

The gusseted webs 24a through 24d are each steered to the new narrow path on the output side of its roller unit. If the system were to operate only three lanes and webs, the two outside lanes would be moved toward the center lane. The converger 36 is an optional feature and is not critical to the bag forming machine.

Figure 12:
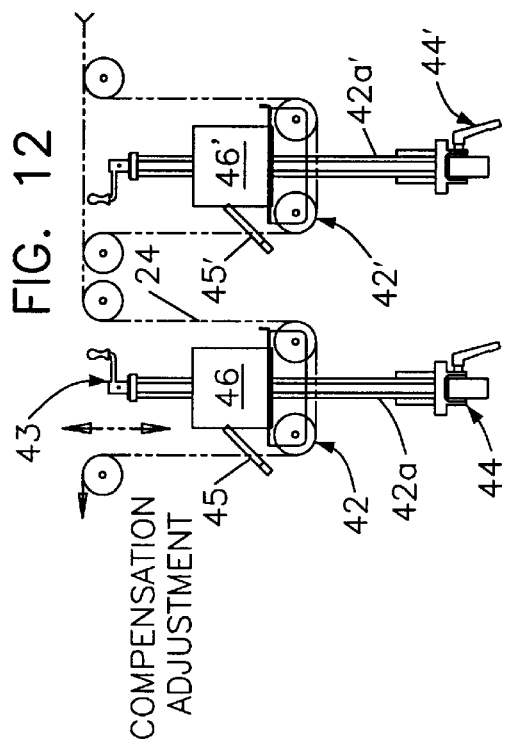
FIGS. 11, 12 and 13 are simplified views illustrating a web length compensation system and an edge center guiding system for a four lane system.
Figure 13:
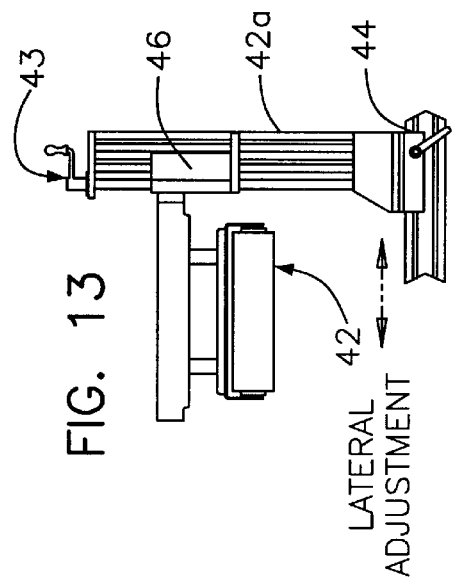
Figure 11:
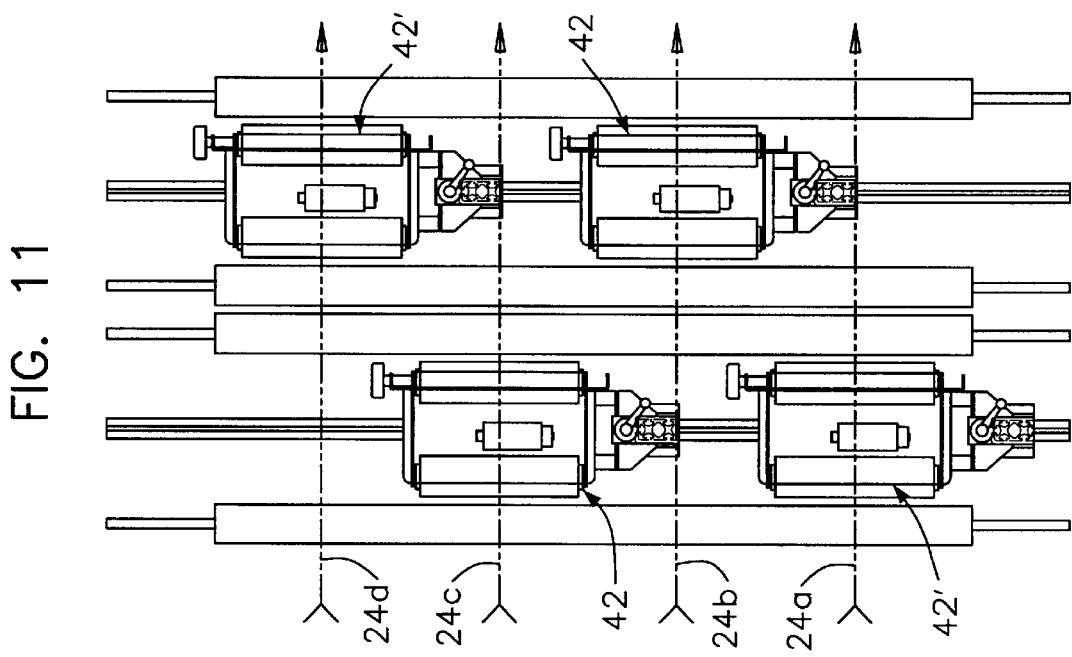

The gusseted tubes 24a–24d each pass through a trim dancer, edge guide and print compensator unit or system 39. A trim dancer 40 (FIG. 6) is mounted above an edge guide and compensator assembly 41, shown more clearly in FIGS. 11, 12 and 13. The dancer 40 is typically a pneumatic or spring loaded system which passes the web 24 into the related edge guides and compensator assembly 41. As shown in FIGS. 12 and 13, the web 24 from the trim dancer passes about a related motorized spaced roller unit 42 which is mounted to a support post 42a. The roller unit 42 is adjustable vertically by a manual control 43 and laterally by a manual control unit 44 on which the support post is mounted. An edge sensor 45 engages the adjustable motorized mount 46 on the support post 42. The edge sensor 45 may be of any suitable type including, for example, an ultrasonic, optical or vacuum sensor unit. To operate a motorized control of the roller unit 41, the roller unit 41 is pivotally mounted with the motorized control pivoting the rollers unit about a pivot axis and establishes a desired precise alignment of each web into the bag forming section 21. The apparatus is known and will be readily understood by those skilled in the art.

The manual adjustment permits setting for different sized webs and different numbers of lanes. The system is again optional, depending upon the required tolerances on the finished bag. Generally, the smaller the bag, the more useful is the edge guiding system.

The vertical adjustment of the roller units 42 is used to set the web in each lane to adjust the length between the slit/seal unit and the position in the section 21 where the web segment is formed. The compensator 41 provides the setup or operator with means to properly register the print of the web with the bag bottom end seal unit. The compensator 41 is therefor not necessary for unprinted bags.

The web supply section 20, as disclosed, has generally been manufactured and sold by the assignee for forming of a special bag having a conventional bottom wall. The elements of the system are known and described in sufficient detail to permit those of ordinary skill in the bag machine art to provide an appropriate web feed or supply section. The positioned webs 24a–24d are then passed through and into the infeed end of the bag forming section 21.

Within the bag forming section 21, the web 24a, hereinafter referred to as web 24 other than where necessary to distinguish the webs, is moved in an intermittent and cyclical sequence. Each cycle includes a movement portion and a work or forming portion, with each portion substantially one-half of each cycle in the present system. For high production of, and thereby a competitive bag, high acceleration and deceleration during each move of the web 24 is required, while maintaining accurate positioning of the web within the several sequential operating and forming stations.

The web supply section 20 operates continuously moving web 24 from the compensator unit 39 and is connected to a take-up connecting unit 47 at the input end of the section 21, as shown in FIG. 6.

The unit 47 consists of a motor driven nip roll unit 48 connected to the web from the compensator 39 and connected via dancer 49 to a slave draw roll unit 50. The dancer 49 takes up the web feed during the operating dwell period of the cyclical movement in section 21. This allows the continuous operation of the first section 20 and the intermittent operation of the section 21. A potentiometer 50a is coupled to the dancer and provides a signal to a controller as to the status of the web movement.

In the illustrated embodiment, the web 24 is moved by a downstream main draw roll unit 51 in combination with the upstream slave draw roll unit 50. The dual draw roll units 50 and 51 operate generally as more fully disclosed in U.S. Pat. No. 5,086,964 which issued to Giles Blaser on Feb. 11, 1992, entitled Dual Drive Web Feed Apparatus and Method, and assigned to Amplas, Inc., to provide smooth acceleration and deceleration of the web movement.

Generally, the bag forming section 21 includes the hinge crease station 52 to form the hinge patterns 6 and 6a within the web, the seal and cut station 53 to form the bag segments with the thin end seals 8 at the center of hinge pattern 6, a stacking station 60 for stacking of formed segments 18 into segment stacks 61 with a predetermined number. A punch station 62 receives each stack 61 and cuts the stack to form bags as shown in FIGS. 1–5. A separation station 63 receives the punched stack of dual segments and separates the stack at the center, with removal of scrap material created in punching the openings and separation material for transfer of the separated bag stacks to a conveyor 64.

During the moving cycle portion, the web 24 is moved from the slave draw roll unit 50 through creasing station 52 to the main draw roll unit 51 adjacent to an cut seal station 53. As more clearly shown in FIG. 14, the main draw roll unit 51 and the slave roll unit 50 are preferably driven by respective servo drive motors 54 and 55. The servo motors permit the rapid acceleration and deceleration, and further establish accurate and repeatable movement of the web in precise and repeatable lengths, even with rapid acceleration and deceleration.

With rapid acceleration and deceleration, the web may, for example, bounce and create a slight but noticeable variation in the positioning of the web within the first creasing station 52. The web 24 for that particular line may then be out of proper forming registry within the creaser station 52, as well as other downstream work stations. Further, subsequent portions of the same web may be misaligned within the system. A shared draw roll loading by motors 54 and 55 maintains the accurate web movement.

Figure 14:
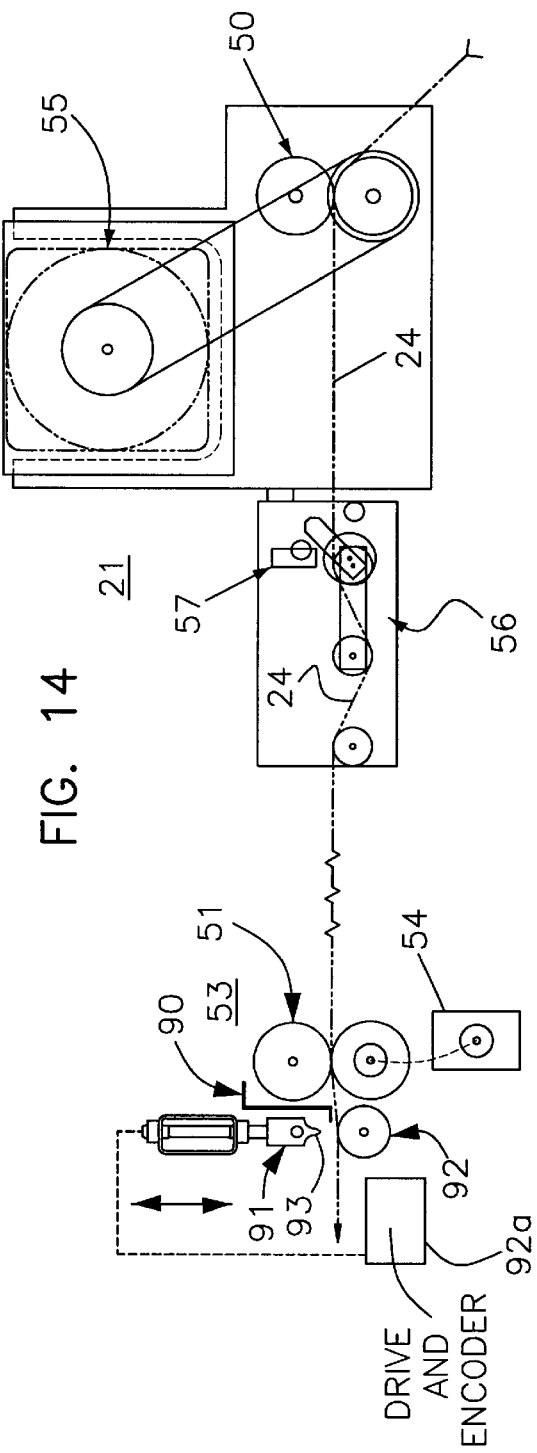
FIG. 14 is an enlarged fragmentary portion of a draw roll drive system shown in FIG. 6.

In the illustrated embodiment, the slave draw roll unit 50 is located at the upstream end of the bag forming machine and driven by its servo motor 55. The web 24 is released through the system and passes through a dancer 56 at the slave roll which operates to maintain tension in the web. A tension sensor 57 is coupled to the web 24 at the dancer unit and coupled to a controller. As shown in FIGS. 6 and 14, the web 24 passes through the dancer 56, creaser 65 and a position scanner 58 to the primary or main draw rolls 51. The main draw rolls 51 are driven by the servo motor 54 to produce a rapid and controlled acceleration and deceleration of the web 24 during the movement portion of each process cycle. The tension in the web 24 at the slave roll unit is reflected at the sensor 57 to maintain a taut and smooth moving web.

Web movement is thus shared by the two servo driven draw roll units 50 and 51. The system is adjustable to meet the web movement specification. The web tension is monitored at the slave rolls by the combination of the small dancer 56 and the tension sensor 57. The tension is controlled by the shared loading of the two servo driven draw rolls 50 and 51.

With improved technology, a direct numerical ratio between the two servo drives may be set to control the web tension between the draw rolls and thereby the precise and repeatable movement of the web.

Figure 15:
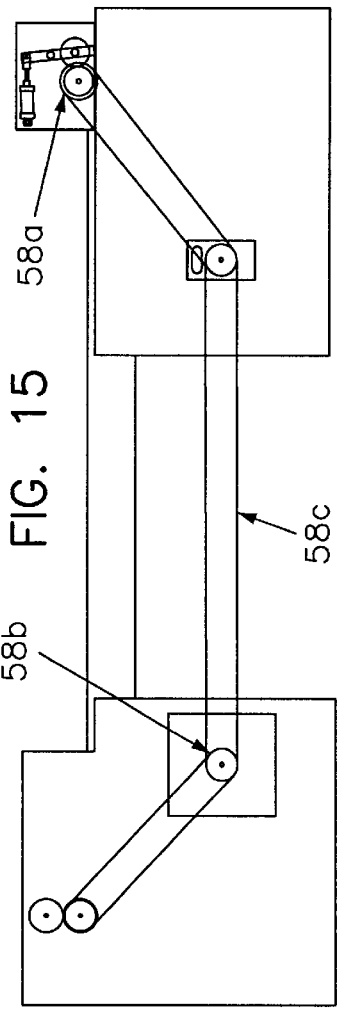
FIG. 15 is a view of an alternate system for the draw roll drive system of FIG. 14.

An alternate control of the movement into the infeed end of the forming section 21 is shown in FIG. 15. In the alternate system, a belt driven secondary draw roll unit 58a is shown connected to the output of the main or primary draw roll unit 58b by a coupling belt 58c. The system provides a less expensive system to establish shared loading control tension and web response to the intermittent motion section of the bag machine. The servo drive system produces a superior control, but is more costly with present day technology.

More particularly, referring to FIG. 6, between the dancer 56 and the primary draw rolls 51, the web is positioned at station 52 within a hinge creaser unit 65 and the scanner 58. The scanner unit 58 detects a discreet registration mark on the printed web, as at 27a (FIG. 6). This may be a separate discreet registration mark provided on each web line or a distinctive point or area 27b of the pattern 27a functioning as the registration mark. In any event, the scanner 58 detects the registration mark, terminates the drive with the web 24 in a proper stationary position within the hinge creaser unit 65.

As shown in FIG. 5, the hinge creaser unit 65 forms W-shaped patterns 66 in the tubular web in alignment with the end seal location 8 of a bag segment 18. The creaser assembly or unit 65 in a preferred construction is shown in FIGS. 16–21. The assembly or unit 65 is described for the particular construction of the particular W-crease formation. The unit with other tools can be used for other applications of layered plastic film or webs.

As shown in FIGS. 16 and 17, the preferred creaser unit 65 includes an upper fixed die unit 68 and a bottom movable striker plate unit 69, the closure of which produces the unique crease pattern of FIGS. 4 and 5 in the properly located flat gusseted web 24. The same creaser unit, however, could be used, with appropriate dies for other patterns and other applications including sealing, punching and other processes which require the working of a plastic film and/or multi-layered plastic films.

As more clearly shown in FIGS. 16 and 17, the lower movable striker plate unit 69 is driven from an eccentric drive unit 70 which is connected to a drive motor 71 by suitable belts 72 and a reduction drive 73. A hydraulic cylinder 74 connects the output of the eccentric drive unit 70 to the movable striker plate unit 69. The hydraulic cylinder 74 is partially compressed during each machine cycle to create a dwell period and to use the lost motion created thereby to compensate for wear of the elements and tolerances in the machine. The hydraulic cylinder 74 is partially retracted during the interrupt cycle between the period for forming of the hinge pattern to avoid double impressions of a crease. The cylinder 74 is fully retracted when the bag machine stops to positively move and space the operative plate and the upper dies from the web.

Motor 71 is preferably an AC motor with a vector drive connected to drive the eccentric system. Coordination and synchronization of the operation of the crease unit 65 with other portions of the bag machine are controlled through a logic control system and as described hereinafter. An encoder 75 on a main eccentric shaft 76 of the crease unit 65 provides the necessary signal for coordinating of the unit through a logic controller, for example.

In the illustrated embodiment, the creaser unit 65 is constructed with a fixed heated die unit 68 to the top side of a movable striker plate unit 69. In this manner, wiring, heating elements and thermocouples are fixed and not subject to movement, vibration, or the like. Conversely, all the hydraulic parts are secured to the plate unit 69, as hereinafter described, beneath the web path and creaser die unit 65 to minimize the possibility of contamination to the plastic web.

The upper heated die unit 68 is more clearly shown in FIGS. 17–21. The heated die unit 68 consists of a supporting tool plate 77 with a heating unit 78 embedded within the tool plate and connected via a suitable electrical lines 78a and terminal assembly 78b for controlled heating of the tool plate 77.

The hinge pattern is established by a pair of assemblies 80a and 80b (FIG. 18) each including separate die tools connected to the plate 77 in the W-configuration 66 corresponding to the crease pattern shown for each of the adjacent bag segments and particularly in the gusseted portions to the opposite side of the end seal location 8, as shown in FIG. 5.

With reference to assembly 80a, each tool assembly includes four individual tool members 81, 82, 83 and 84 interconnected at the apexes of the W-configuration. The tool members 81–84 are preferably of a suitable tool steel and are shown L-shaped, with a base which is firmly bolted to the plate as by end bolts 84a for controlled heating of the tool members. Each tool assembly is constructed as more clearly shown in FIGS. 18–21.

The outer end tool members 81 and 84 are correspondingly formed as a generally L-shaped element, as shown in FIGS. 19–20, formed preferably of a tool steel. The L-shaped element 81 is described. The element includes the attachment base 84a and upstanding arm 84b. The upper wall of arm 84b includes a pair of laterally spaced creasing edges 85 and 86 connected by the base 84a abutting the plate 77. The edges 85 and 86 are flat rectangular edges which move into pressure engagement with the tubular gusseted web 24. Each tool element or member is fixedly secured to the heated die plate 77 to heat the aligned creasing edges 85 and 86 but to a degree that positively prevents molten attachment between the plastic layers of the web 24 to each other. In practice, the die plate 77 is heated to approximately 200° F., or slightly below to eliminate any possibility of a hot seal.

For example, the heating unit includes a plurality of calrods 78 or other suitable heating elements embedded within the base plate 77. The rods 78 are connected to the suitable electrical supply connection or assembly 78b at the edge of the plate and provide for the heating of the plate and particularly the several tools 81–84.

Temperature sensors 78c are coupled to the outer surface of the base plate 77 and by monitoring the temperature at those points maintains the tool members at a desired temperature to effect the cold creasing by the crease elements. The temperature as noted is held at or below the temperature which will cause a melting and fusion of the layers at the interface in the gusseted layers of the bag segment. However, the temperature contributes to the normally identified cold seal and in effect creates a cohesion or adhesion between the layers without actually creating a joining of the layers with a fused connection.

Figure 18:
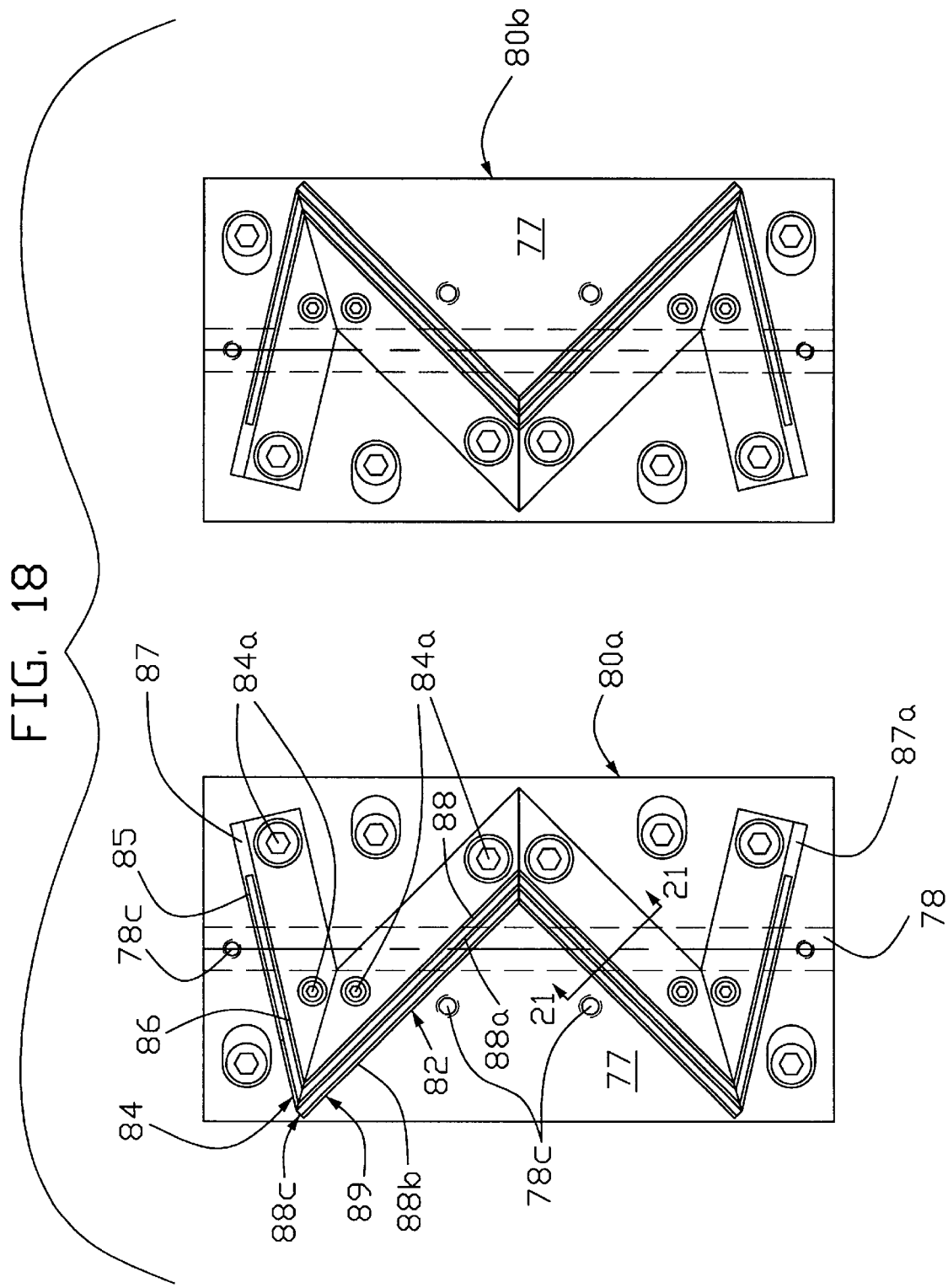
FIG. 18 is an enlarged view of a heated die unit of FIGS. 17 and 17a, taken generally on line 17a—17a of FIG. 17.

In addition, the tool members 81 and 84 and particularly the upper wall of the arms 84b are specially formed with a flat extension 87 and 87a of the upper wall from the two edges, as shown most clearly in FIGS. 18–19. The flattened non-grooved outer flat extensions 87 and 87a at the end of the pattern are located just inwardly of the gusset 17 and 17a and slightly impresses the center of the bag in the non-gusseted area. However, these flat non-grooved extension 87 and 87a prevents concentration of die pressure and prevents any significant thinning of the plastic film or layer in the non-gusseted area. This is desirable to eliminate any possible generation of a weak area within the bag proper. Element 84 is similarly formed and mounted.

The inner tool members 82 and 83 of the W pattern tool assembly are also bolted to die plate 77 and are specially shaped and located to form the second and lower or bottom part of each V-shaped hinge pattern in the bottom portion of the adjacent bag segments 18.

With reference to tool member 82, and FIGS. 18 and 21, the member 82 has an L-shaped cross-section with a base and an upstanding arm with three raised hinge edges 88, 88a and 88b. The tool member 82 is bolted to the heated plate 77 and extends from the outer seal end area 8 at an angle to and slightly beyond the outer coupled outer or upper tool member 81, as shown in FIG. 18. The two inner ribs 88 and 88a of tool member 82 are substantially aligned with the ribs 85 and 86 of the outer tool member 81, with the third rib 88b extending outwardly of the mating ribs. In the preferred embodiment, the inner end of tool member 82 terminates within the gusset portion of the bag, with the exception of a small extension of the innermost ribs 88. The outer ends of the inner tool members 82 and 83 thus project outwardly of the outer tool members 81 and 84 at the side edges of the gusseted tubular segment as at 88c. The inner ends thereof, however, terminate with the two outer ribs within the gusseted portion of the bag.

The illustrated embodiment of the invention discloses the steel tool members with the rectangular cold blocking die ridges. The rectangular configuration has been found to provide a satisfactory cold sealing of the plastic layers. However, various other configurations can be readily used including the disclosures in the prior identified pending applications such as a blunted generally rectangular ridge. Care of course must be taken that the cold blocking members do not actually cut or tend to sever the plastic. The tool members or cold sealing members could thus have a relatively broad curved configuration providing a corresponding complete or partial curvature within the plastic layers within the broadest aspect of this invention so long as the layers will have the cold seal adhesion of a characteristic which provides for the opening, as previously disclosed.

In the forming of the hinge pattern, the three hinge lines 14 adjacent the bottom seal 8 must maintain at least one of the three hinges lines completely within the gusseted position 17 of the final bag. The system with the three lines is designed to center the lines on the inner gusset line 17, as shown in FIG. 18A, and permit movement as in FIGS. 18B and C. As shown in FIG. 18A, the three hinge lines are preferably centered on the gusset line 17 at the bottom seal 8. If the web moves slightly such that the two inner lines 88 and 88a (FIG. 18c) are outside the gusset line 17, but the third line 88b is within the gusset portion, the bag will open with the flat bottom. If, however, the movement is so great that no hinge line of the set 14 is within the gusset area (not shown), the bag will not produce the desired flat bottom wall. If the three lines are not centered but offset inwardly, the outermost line 88 moves into the gusset portion and maintains the desired flat bottom wall (FIG. 18b).

Although the illustrated embodiment produces substantially accurate lateral location of the four webs, 24a, b, c, and

*d* due to possible imperfection in web structure, the narrow multiple hinge lines may still encounter some slight lateral movement of the web. The three crease lines have been found to maintain highly reliable production of bags which readily develop the flat bottom wall. In developing the preferred apparatus, the upper leg of the V-shaped pattern can have a rather loose adhesion while the lower triple leg is desirably formed with a firmer adhesion between the outer layers of the separated gusset. This combination appears to promote ready opening of the bag and establishing a very rapid flat bottom wall structure, but such is not considered necessary. The upper leg of the V-shaped crease pattern must readily open in order to easily and most effectively open the bag into the flat bottom wall structure. Once opened, the open upper position promotes the opening of the bottom portion to create the flat bottom wall.

Further, as illustrated in FIG. 17 the creasing unit is preferably constructed with guide plates or elements 89*a* and 89*b* secured to the base of the creaser table as by suitable bolts. The guide plates project inwardly within the gusset portion 17, with the innermost end 89*c* aligned with the designed location of the inner end of the gusset 17. The film guide elements 89*a* and *b* are located upstream of the creasing tools. The elements are adjustably mounted to permit the location in accordance with the particular depth of the gusset in relationship to the bag width. The adjustable length is required for adapting of the machine to different size bags and the like.

The guide plate 89*a* is formed with a rectangular mounting portion 89*d* and an upstream angled portion 89*e* extending inwardly and downstream to an inner nose 89*f* which is rounded to provide a smooth gradual engagement into the inner end of the gusset. The plate is a relatively thin plate having a constant edge radius to present a continuous smooth surface for guiding of the film without damaging of the film in any manner. Thus its sole function is to guide the film into the creaser unit. The combination of the guide members and the preferred illustrated tool assembly has been found to provide a repetitively reliable bag construction at relatively high speeds.

In addition, a pair of separation plates 89*g* and 89*h* are secured to the creaser unit downstream of the tool members. Each of the separation plates is identically constructed and again secured to the unit for adjustable mounting laterally to accommodate different size in gusseted bags. The separation plates are aligned with the gusset 17 in the center of the gusseted film web. The adjustable mounting again provides for adjustment to different size gussets and the like. The plates are secured by brackets 89*i*, similarly constructed and mounted. Referring to one bracket 89*i*, it is shown mounted to a bracket extension of the lower guide block. The separation plate projects from the bracket inwardly into the path of the film web 24 and in particular is located within the gusset 17. The portion within the gusset includes a upstream nose 89*j* having an inner straight edge 89*k* located substantially adjacent the inner gusset edge of the web. A tapered portion 89*l* extends from such inner wall outwardly and downstream to the mounting bracket. The nose 89*j* is again rounded with a continuous radius and the edge is also rounded to provide a smooth guiding engagement with the web 24. The separation unit has a tapered edge 89*m* angled at a slightly different angle than that of the inner three aligned rib members of the hinge lines 15. As the film moves downstream, the upstream nose engages the crease unit, particularly the double rib portion which is essentially full engaged and separated prior to the nose entering into the three rib portion. The web moves essentially through the three rib portion in essentially simultaneous motion because of only a slight difference in angular orientation of the plate relative to the angular orientation of the triple rib formation within the web. The separation of the opposite sides of the gusset has been found to release the gusseted portion to positively prevent any sticking or adhesion between the gusset members in the opposite sides of the side panels which extend from the seam 5. Though not critical, it has been found that the illustrated embodiment provides a particularly effective system and produces a bag which readily opens without the necessity of positively entering into the bag to open and create the flat bottom wall.

In addition, the separation plates function as a web guide to correct and move the separated gusseted web into alignment for entry and centering within the downstream punch unit.

This of course will further promote the accurate formation of the condition of the open end or opposite end of the processing of the opposite end to any desired configuration.

Although the exact size of the ribs in elements 81–84 are not critical, a pattern with each rib having a width of thirty thousands of an inch (0.030 inches) and a spacing of sixty thousands of an inch (0.060 inches) has produced high quality bags. The bag had a gusseted width on the order of seven (7) inches and side gussets on the order of two and one-quarter (2¼) inches. The hinge lines 14 and 15 are in a preferred orientation, with the hinge lines 14 at forty five (45) degrees with the gusset 17 and the hinge lines 15 at substantially thirteen (13) degrees to the hinge lines 14.

The combination of the cold seal rib pattern, and particularly without significant location of the outer ribs into the end seal area of the bag segment, produces a particularly satisfactory hinge pattern. The special V-shaped tool members 81–82 and 83–84 form the hinge pattern with the thinned hinge lines thus located and connected by the original plastic film of the web producing a particularly satisfactory opening of the bag.

During the forming portion of the cycle, the lower striker plate 69 moves upwardly and forces the web 24 into firm engagement with the upper die member to effect the hinge impression within the bag web. The platen or striker plate 69 is made with a top pad of a relatively soft face material, such as wood or plastic material as at 69*a*, and is impressed by the steel tool member, and particularly the hinge line ribs, to form a mating female die member. This combination of the upper steel tools with a softer wood or plastic striker pad provides accurately formed creases, with the creases having fine and thin spaced rib-like creases joined by the basic plastic material, as illustrated in FIGS. 1–5.

In one typical application, the striker plate 69 is positioned by the hydraulic cylinder to establish a forming pressure on the order of 8,000 pounds for each lane. The necessary pressure and time can be readily established for any particular application.

In the next sequenced movement of the web, after forming of a creased pattern, the web 24 is moved in a further step equal to the length of a bag segment, and during the stopped cycle, the web is properly aligned by the scanner. The web segment 18 is thereby aligned within the cut and seal station 53 and with the hinge pattern aligned to be severed precisely on the center of the W-pattern and the seal line 8. The web is thus moved the length of the dual bag segment in each movement cycle to align the center line of the W-pattern in precise location with a generally known side weld cut/seal unit 90 which has been used to form known T-shirt bags and has been specially used herein to form an end seal and particularly to form the essentially flap-less end seals 8 along the bag bottom.

Figure 22:
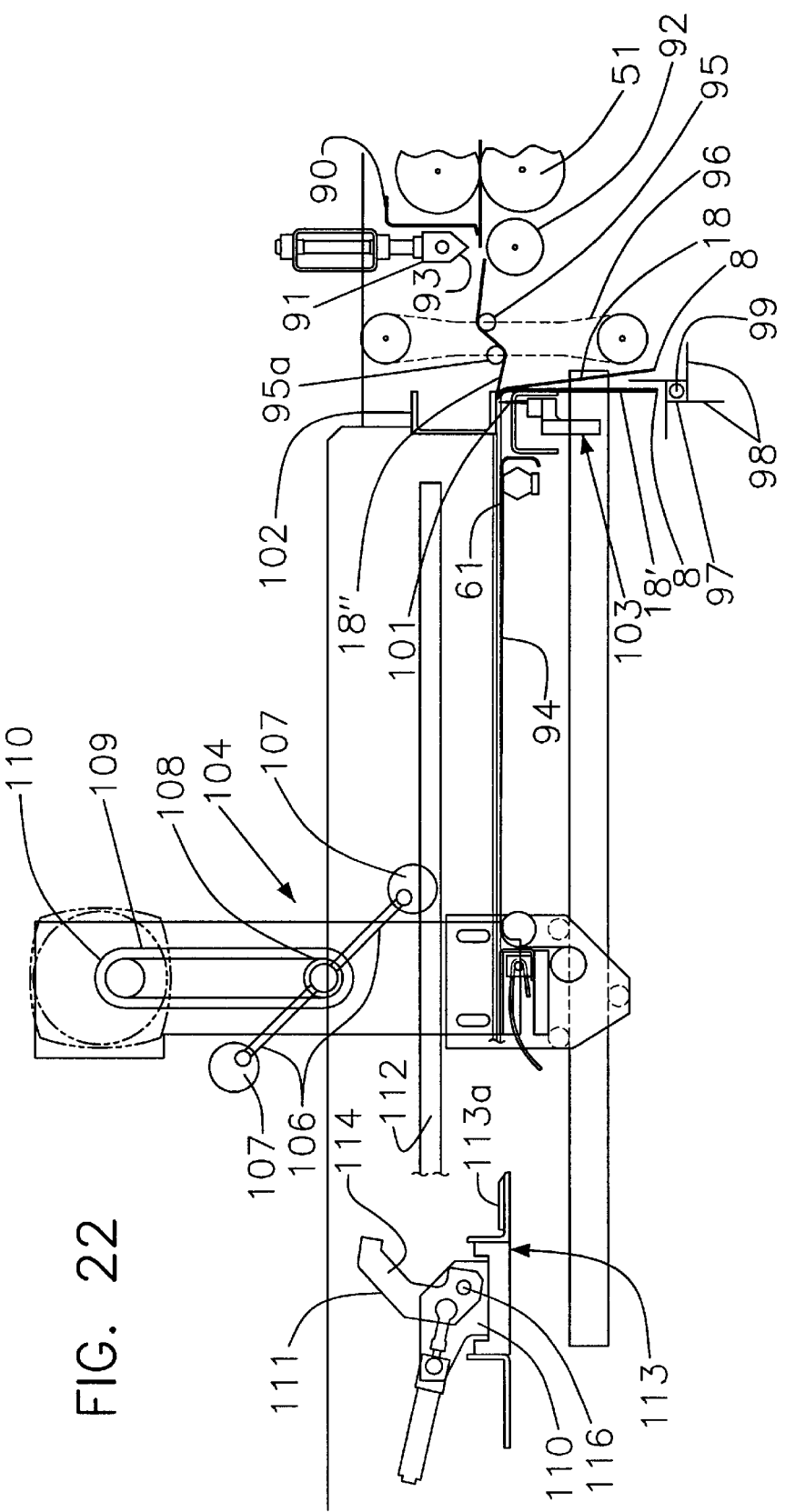
FIG. 22 is an enlarged side elevational view of a cut and seal assembly for severing of the tubular webs into a dual bag segment and a stacking table for receiving and stacking of successive bag segments.

Referring particularly to FIG. 22, a side weld cut/seal unit 90 is shown located immediately downstream of the main draw rolls 51. The bag segment 18 has the downstream portion supported in the stacking station and the upstream seam line 8 located within unit 90.

In accordance with known construction, the unit 90 includes an upper reciprocating sealer head 91 and a lower seal roll 92 with the web 24 passing therebetween. The head 91 includes a thin heated cutting edge 93 which severs the web and immediately heat seals the web to the opposite sides of the cut. The heated head 91 thus rapidly separates the web and forms the positive thin seal 8 to the opposite sides thereby and forming the bottom seams 8 in the adjacent bag segments, and particularly the bottom wall seams for each bag of the segment.

A motor drive and encoder 92a is coupled to move the head 91 into cutting engagement with the roll 92 to cut and form the seal lines, thereby forming like end seals 8 in the adjacent bag segments. The roll 92 is also coupled to the motor drive and is indexed around at each cut to accurately slit and form each seal line.

The side weld cut/seal unit 90 is well known in the art and has been used in the formation of the side seam in T-shirt type bag members but has not been used in the forming of bottom seals in plastic bags or in systems with dual bag segments such as in the present application, or in other like applications. Thus, the side weld units have been used for forming of welds in the side of bag at the end of a web to seal and separate the single T-shirt bag from a web. The side weld process is particularly applicable to thinner films.

Where heavy or laminated films are used, a known twin seal process may be used, with driven or non-driven knives, but generally may not provide the optimal construction with the minimum bottom seam. The side weld process is also advantageous in that the thin seams produce a flatter stack of bag segments and resulting bags because there is essentially no shrinking of the seal and/or film adjacent to the seal.

The separated dual bag segment 18", shown in FIG. 22, corresponding to that of the segment 18 shown in FIG. 5 is moved from the cut/seal unit 90 partially over a stacking table 94 of station 60 and draped over the end of table 94, as shown most clearly in FIG. 22.

The cut/seal unit 90 includes an air finger 94a located upstream of the cutting blade 93 and directs an air stream down and through the cutting opening between the cutting edge 93 and the roller 92. The air blast cools the cut edge as it is raised and also promotes the downstream movement of the severed web segment 18" from the cut/seal unit 90 through the system onto the stacking table 94.

The last severed bag segment 18" has the downstream end resting on the stacking shelf or table 94. The severing of the upstream end is completed. A pair or set of rotating tucker bars 95 and 95a are located within a free space between the cut/seal unit 90 and the inlet end of the bag shelf or table 94. The tucker bars are connected to a vertically oriented belt member 96 which moves the tucker bars vertically in a reciprocating sequence and in timed relationship to the side weld unit 90. The upstream roll or bar 95 is below the segment and raises the aligned segment. The downstream roll or bar 95a is located over the segment and moves the segment down to drape the upstream end of the bag segment 18" over the end of the shelf or table 94.

The tucker elements or bars 95 and 95a operate continuously and in synchronism with the cut/seal unit 90. As the segment 18" is transferred from the cut/seal unit 90 the upstream bar raises upwardly to move the aligned web upwardly. The downstream tucker bar simultaneously moves down to drag the web downwardly and drop it into the draped location while permitting the downstream portion of the bag to move fully onto the stacking table 94. The tucker bars are of course controlled through the known cyclical timing of the cut/seal unit.

A rotatable cooling vane unit 97 is rotatably mounted at the table 94 adjacent the lower end of the bag segments 18 on the table. The illustrated vane unit 97 has four vanes 98 secured in 90° spacing to a rotating shaft 99 located just below the lowermost end of the draped bag segments 18". The shaft 99 is stepped 90° at each cycle of the cut/seal unit 90. Vane unit 97 thus indexes in a timed manner with the unit 90, and one vane 98 engages the draped hot end of the segment 18" to prevent the hot end seal 8 of the newly cut segment 18" from engaging the prior cut and draped segment 18' of the stack 61. The cooling vane 98 holds the new draped segment 18" from the prior segment 18' until the seal has cooled sufficiently to prevent welding of the ends to each other.

As the cut end drapes over the shelf end and at the end of the crease cycle, the next bag segment 18" moves with the downstream end moving through the tucker bars onto the shelf 94. The leading or downstream end of the segment 18" is sufficiently cool to prevent adhesion to the prior bag resting on the shelf or table 94, and a new segment 18" is thereby located within the cut/seal unit 90 for separating and stacking at the next work cycle.

Each bag segment 18 is secured in the stack 61 on stacking pins or needles 101 at the upstream end of the shelf 94. The segment 18 moves over the shelf or previously deposited segment, and is pushed onto the needles 101 by a stacking pin platform 102, which is vertically moved in timed relation to the cut/seal unit 90 in any suitable manner, such as a cam unit, not shown. The pin bar 103 supporting the pins 101 is also similarly movable as by a cam unit, vertically to allow addition of each bag and to secure the bag in the stack, and finally lowered to release the bag stack 61 after a selected number of bags are placed on the stack. The needles 101, platform 102 and pin bar 103 are located at a fixed end table member 103a. Stacking of plastic bags on pins and the like is known and provides a reliable and recognized structure in this particular application.

The downstream end of the stacking shelf 94 includes a stack flattening unit 104 which engages the downstream end of the stack to flatten each bag segment end added to the stack, as shown in FIGS. 22 and 23. This insures the proper positioning of the stack and convenient and positive gripping of the stack by a carriage conveyor 105. The illustrated flattener 104 includes four pairs of laterally spaced rotating arms 106 per lane of bag segments, rotating on an axis parallel to and across the shelf 94. The arms 106 are spaced to engage the stack in the aligned lane. A rotatable disc 107 is pivotally secured to each end of each arm 106 and moves to engage the uppermost bag and flatten the same into the bag stack. The arms 106 are coupled to a single shaft 108 which extends across all four lanes. A motor 109 is connected to rotate the shaft and includes an encoder 110 connected into the control system for operating the arms in relation to the bag formation and stack removal.

The stacking table 94 preferably is constructed consisting of a movable support including the unit 104 and a rigid downstream plate 105a with the downstream end of each segment 18 on the plate and abutting an end stop member or beam 105b in the raised position during the stacking cycle to properly align the stack for subsequent movement. From the plate 105a, the upstream end of the table is formed by a flexible belt 105c secured at the upstream end on a roller 105d. The movable support with the plate 105a and the upstream roller 105d are mounted for selective positioning longitudinally of the bag movement, with the belt wrapping on the roller 105d extend from the member 103a and to maintain the flat table. The table 94 is thus adjusted at setup in accordance with the length of the dual segment bag to maintain the appropriate draping of the bag segment into the cooling area of the system, and with the downstream end of the stack properly located. The support, plate and roller can be actuated through a suitable drive system such as a fluidic or hydraulic drive system or manually positioned through a suitable manually actuated drive system during the set up of the line for making of the bags, with the known bag length.

The separated dual bag segment stack 61 is preferably transferred by a carriage conveyor 105 having a gripper finger assembly and a base plate to grasp the end of the bag stack 61 on the shelf 94.

The illustrated conveyor 105 consists of a trolley unit 110 movable from and to the stacking shelf 94 for sequentially moving each bag segment stack 61 therefrom to the punch unit and thereafter through the system to the index conveyor 64. A releasable gripper 111 on the upstream end of unit 110 grasps the downstream end of the stack 61 of bag segments on the shelf 94 and carries them to the punch station 62. A separator trolley unit is provided for each lane, and similarly mounted for simultaneous movement, as follows.

A trolley track 112 is secured to the opposite sides of the bag machine and extends from the stacking shelf 94 to the index conveyor 64. The trolley unit 110 is secured to a bottom supporting plate 113 extended across all four lanes, with, the opposite edges mounted for movement within the track 112. Front section plate 113a is positioned on the common plate and is movable beneath the bag stack 61 on the bag shelf 94 with the trolley unit positioned adjacent the downstream end of shelf 94. A plurality of clamping fingers 114 for each lane are pivoted to the plate 113 and extend over the front section plate 113a in each lane to form the gripper 111.

The trolley unit 110 is movable along the track 112 through a suitable drive mechanism, such as a servo motor driven belt or chain 114a mounted beneath the track and coupled to common support plate 113. The trolley unit 110 may be coupled to the opposite end of a belt 114a. The belt is connected to the drive in opposite directions by a servo motor 115b, or other suitable high response motor or power unit, which is operated in accordance with the sensed operation of the other forming units, as presently described. The unit 110 is thus moved back and forth between the several pickup and discharge positions, as presently described.

More particularly, with reference to FIGS. 22 and 23, the stacking shelf 94 has a pair of spaced edge slots 115 at each bag stack. Finger units 114 are correspondingly spaced and pivotally mounted to the trolley unit as at 116, with a fluid actuator 116a, such as a pneumatic actuator, connected to pivot the fingers from a raised position as shown in FIG. 22 to a lower clamp or grip position, as shown in phantom in FIG. 22.

The underside of the bag shelf 93 includes a spring-loaded clamping arms 117 aligned with the finger openings or slots 115 in the shelf 94 to support the stack 61 during the stacking period. The spring arm 117 curves downwardly at the downstream end to permit the plate 113 to move beneath the bag shelf 94 and depressing the spring arm beneath the trolley plate. The pivotal fingers 114 are pivoted downwardly and clamp the bag stack 61 between the bottom plate 113 and the fingers 114. The bag stack is compressed to create a firm grip.

When a predetermined number of bag segments have been placed on the stacking shelf 94, the trolley is in a pickup position. The pin bar 103 is pulled down by the pneumatic unit, withdrawing the pins 101 and releasing the stack 61. The cylinders 116a are actuated and the fingers 114 move to the closed position, dropping the outer end thereof downwardly into the firm clamping engagement with the released stack. The trolley unit 110 is actuated to move downstream, pulling the stack 61 with it, and moving the stack into alignment within a punch unit 120, shown in FIGS. 25–27. The pin bar 103 is reset to receive the following segments to form a new stack.

The punch unit 120 cuts through the aligned bag stack 61 (FIG. 27) to define the two individual bags on the opposite sides thereof. The punch unit 120 cuts the pattern of the open end of the two bags, the finger holes, as well as the vent opening pattern where used.

Figure 26:
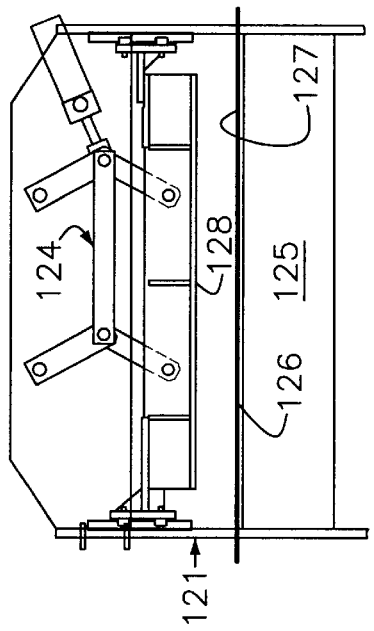
FIG. 26 is a view taken generally on line 26—26 of FIG. 25.
Figure 27:
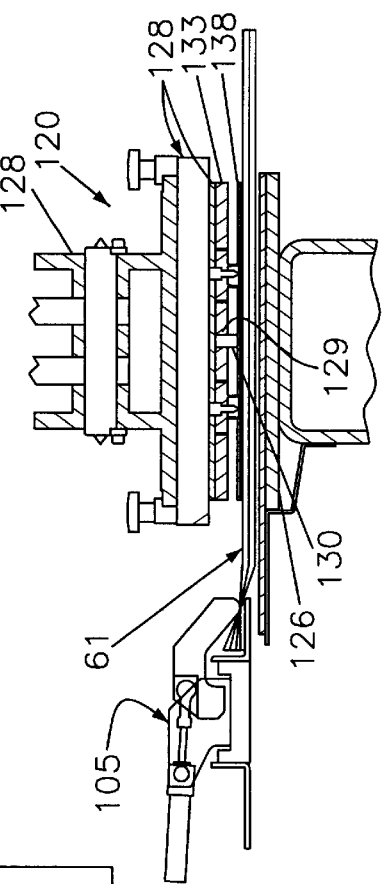
FIG. 27 is a view similar to FIG. 25 with the bag stack in place within the punch unit.
Figure 25:
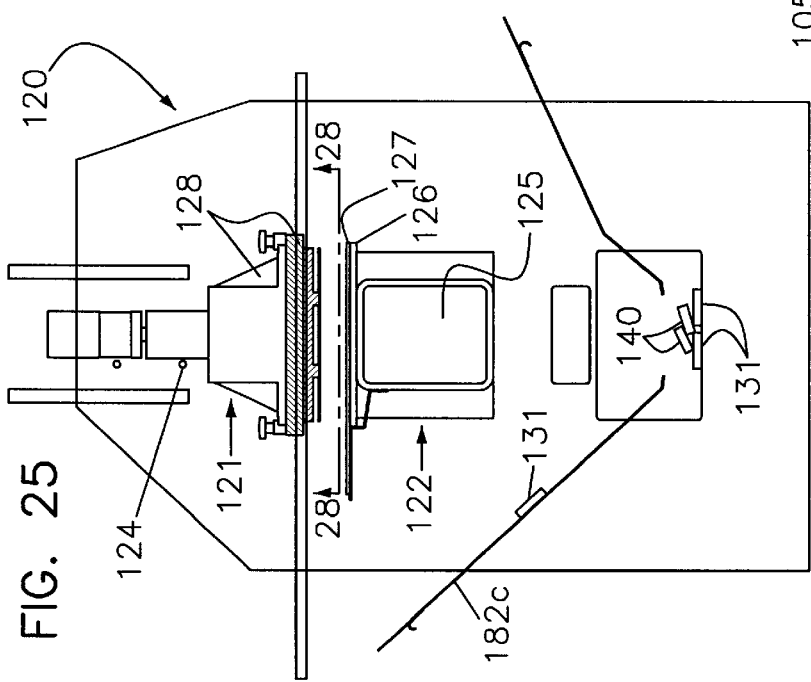
FIG. 25 is a side elevational view of a punch unit for forming of the bags from the bag segment stack.

Referring particularly to FIGS. 25–27, the punch unit 120 includes an upper die unit 121 and a lower strike plate unit 122 mounted in opposed relation.

In particular, the upper die unit 121 is secured within the punch unit frame 123. A hydraulic cylinder and linkage unit 124 is connected to unit 121 for raising and lowering of the die unit 121.

The lower strike plate unit 122 is secured beneath unit 121 to a fixed base 125. The lower strike plate unit 122 is constructed with a rigid anvil 126 secured to base 125. A plastic striker plate 127 is secured to the top of the anvil 126. The plate 127 is formed of suitable material, such as wood or plastic, and preferably plastic, to receive the cutting edge of the cutting blades for severing the bags in the stacks.

Within the punch unit 120, the plastic plate 127 is movably mounted upon the base anvil 126, and is shown coupled to a suitable unit to slightly reposition the plate relative to the upper die unit 121 for each punch operation. The illustrated system includes a drive unit 127a to the one side of the punch unit. The plate 127 extends across all lanes of the machine. The drive unit 127a consists of rotating shoulder bolt and bushing unit 127b which is secured to drive pivot shaft 127c.

Figure 17A:
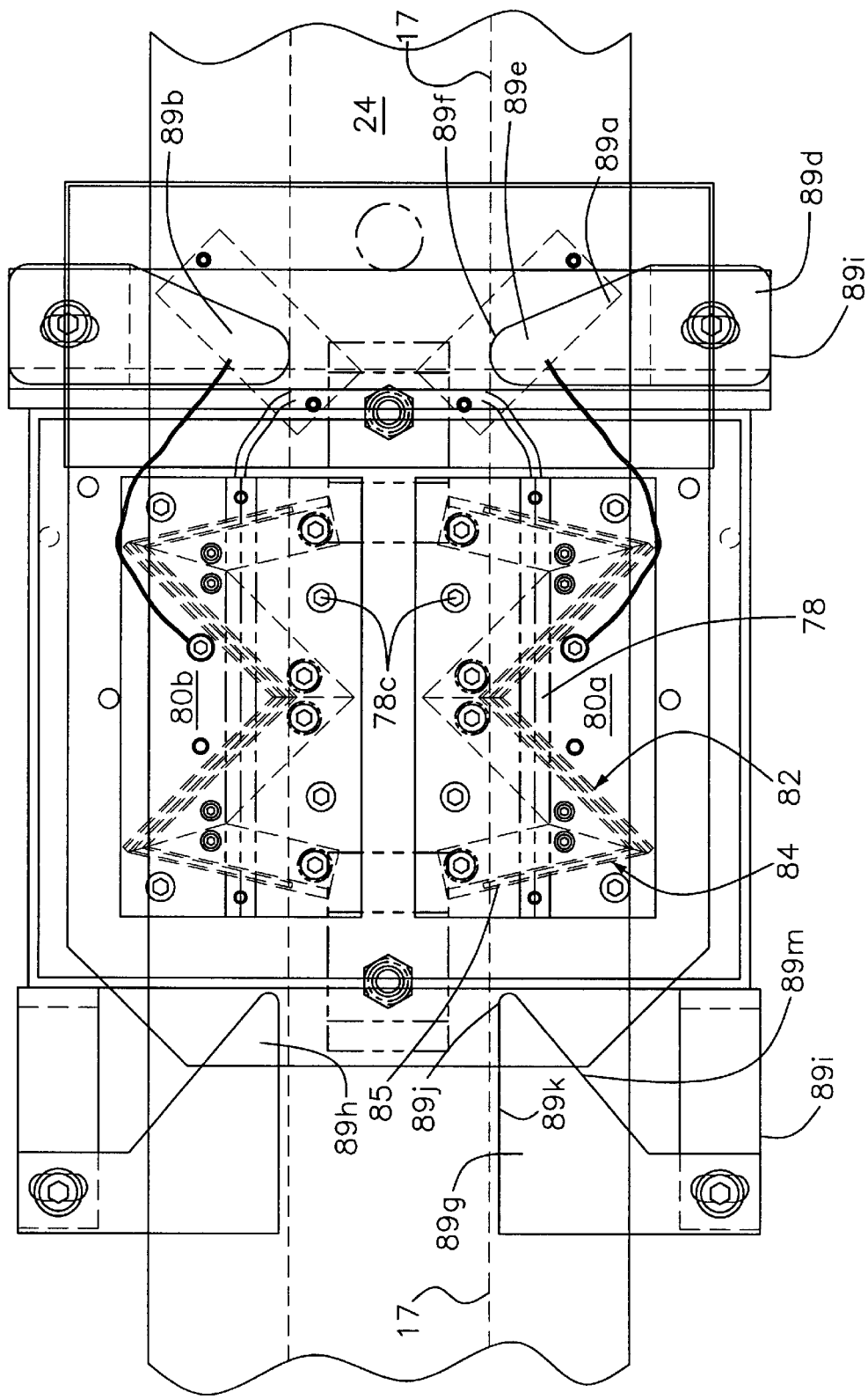
FIG. 17a illustrates a heated die plate in the die assembly.

A bracket 127d is secured to the shoulder bolt and bushing and projects laterally with the outer end secured to the striker plate 127. An air cylinder 127e or other suitable drive is connected to a drive mechanism including a plate 172f coupled to the pivot shaft 127c immediately adjacent the bolt and bushing. The drive is connected through a one way clutch to step the pivot shaft 127c and the interconnected shoulder bolt and bushing 127b through a circular path 127g as shown in FIG. 17a. Each step results in a corresponding slight repositioning of the plate 127 within the punch unit, and in particular repositions the aligned surface of the striker plate with respect to the punch unit, particularly the upper die unit. The operation of the air cylinder and the stepping of the system to reposition the plate is of course readily coordinated through a central controller which continuously repositions the plate for each stroke of the punch unit. The illustrated system has been found to provide a reliable and practical movement for the striker plate. Any other form of movement for the striker plate may be provided to maintain the reliable operation and result from the punch unit. This of course establishes a highly repeatable cutting action by the die unit, as presently described for appropriate repeatable severing of the bag segment stacks and the desired forming of the slug units, with the remaining tie strips to maintain the reliable movement of the bag segment stack from the punch unit into and through the separation unit.

The upper die unit 121 includes a plurality of separate blades and machined dies for selectively cutting through the bag segments as presently described. The upper die unit 121 has a rigid support plate 128 with separate die plates bolted thereto. (FIGS. 28–30)

A first die plate 129 is provided with spaced rule die blades 130 for forming of a bowtie center scrap or slug 131 and producing the opposite open bag ends in the segment. Cold blocking pins 130a project through plate 129 and compress the slug 131 and particularly on the opposite sides of slug 131 to also secure the cut elements of the bag segments to each other.

Figure 29:
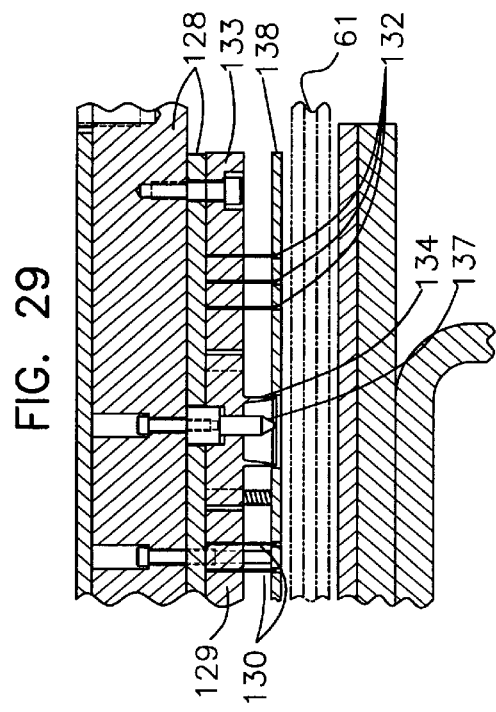
FIG. 29 is a fragmentary enlarged sectional and simplified view generally taken on line 29—29 of FIG. 28.
Figure 30:
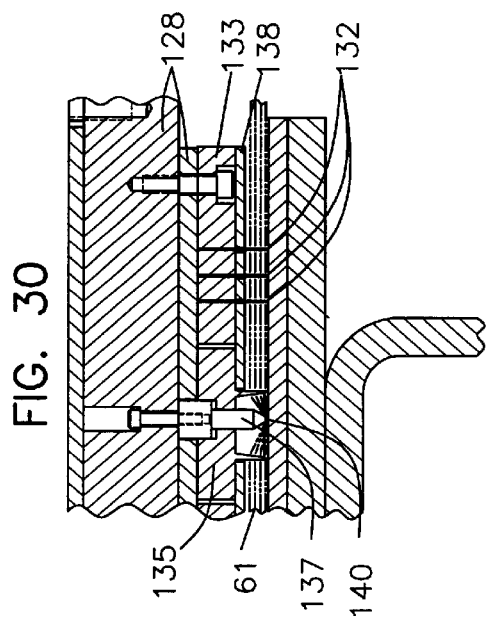
FIG. 30 is a view similar to FIG. 29 with the punch unit in the closed position.
Figure 28:
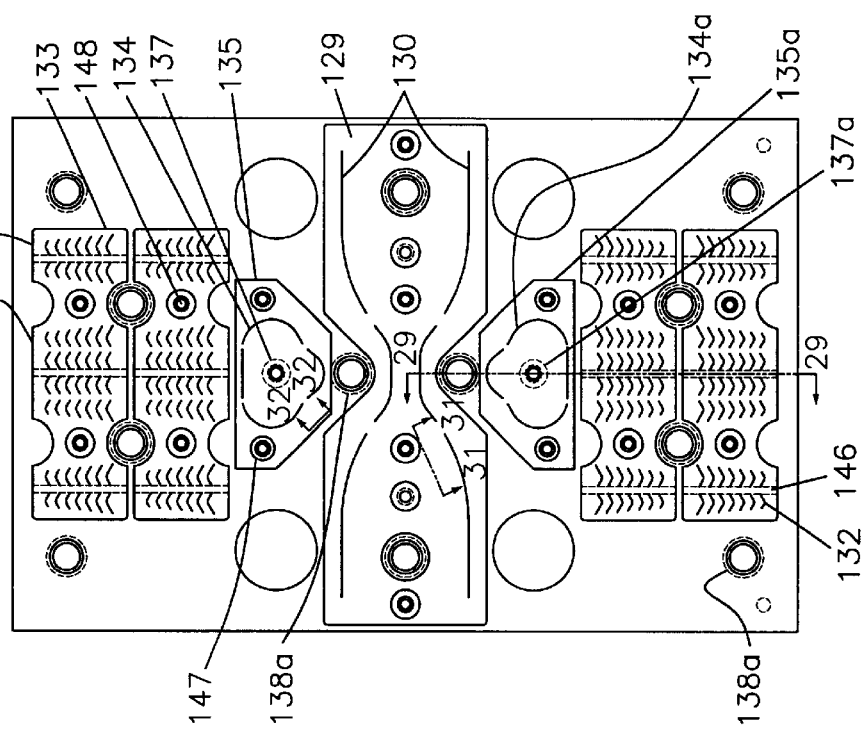
FIG. 28 is a sectional view taken generally on line 28—28 of FIG. 25.

As shown in FIGS. 28, 29 and 30, rule die blades 132 are provided in separate rule plates 133 and 133a in outwardly spaced relation to the rule die plate 129 and structured to form the vent openings in the bags of the stack 61.

One-piece machined dies 134 and 134a having the blade formed as a part of the die rule plates 135 and 135a. The plates are spaced to form the finger openings 15 in the bags. Cold blocking pins 137 and 137a are also secured to the plates 135 and 135a centrally of the die blades 134 and 134a, and similarly pins 131a are secured to the plate 129 to the opposite sides of the center slug 131. The cold blocking pins 131a–137a are all shown as rectangular pins having blunt ends.

A spring loaded compression plate 138 is mounted to the plate 128 with matching openings aligned with the several rule die blades 130 and 132 and the machined die blades 134, and the blocking pins. Compression springs 138a are located within the plate 138 and 128 to transmit the force to the die units for the rule and the machined die blades.

With the bag stack 61 located within the open punch unit 120, the compression plate 138 is extended by the springs 138a and is spaced from the bag stack 61, as shown in FIG. 29. With pressure applied, the die unit 121 is lowered, forcing the compression plate 138 down to compress the bag stack 61, and with continued movement the springs compress to increase the compression force on the bag stack 61, as shown in FIG. 30. Continued pressure forces the several die blades down, cutting through the stack 61 and engaging the plate 127 on the bottom strike anvil 126.

As shown, the rule die blades 132 for the vent openings, and similarly the rule die blades 130 for the center formation of the open end of the bags, move completely through the stack 61 forming slits in the bags and forming the slug or scrap 131 at the bag ends. The blunt cold blocking pins 131a move down into the slugs 131 and force the individual film layers into forced engagement and form a cohesion between the layers, which will then move as a single unit.

The machined die blades 134 and 134a for the finger openings similarly sever through the stack 61 to form a removal slug or scrap 140, with cold pin 137 further compressing the severed opening slug 140 to produce a similar cold seal of the plastic layers within slug 140, which then move as a unit.

In the preferred construction as previously discussed, the open end of the bags and the finger openings include small tie strips within the respective openings. These insure that the segment stacks 61 move as a unit from punch unit to the separation station. In the illustrated embodiment (FIGS. 31 and 32) the tie strips are created within the bottom bags of each stack 61 by notching the center rule die blades 130 and the machined handle opening dies 134.

A notch for one tie strip within the bag end is shown in FIG. 31. The rule die blade 130 is formed with a small notch 141 in the cutting edge 142, as shown in FIG. 31, which is taken on the section lines "A" in FIG. 28. The notch 141 is quite shallow and the blade will cut through the plastic bags, except for the few compressed layers abutting the pad at the notch 141. In one bag design, the notch has a vertical depth and a horizontal width dimension of 0.030 by 0.030 inches.

The machined die blades 134 for the finger hole openings are similarly constructed with an even smaller edge notch 143 in the cutting edge 144, such as shown on section lines "B in FIG. 32. In one design, this notch 143 was 0.010 inch wide and 0.025 inch deep. Both notch systems provided satisfactory temporary connection of the bags, without an actual thermal bonded connection.

Further, the vent openings 13 are shown as lines of wavy slits 145 which are vertically spaced within the bag wall, and are shown in FIG. 28 for one practical application to produce a ventilating system in the bag for release of heated air within the bag. As shown in FIG. 28, the slits 145 are also formed in vertically spaced groups. The openings 13 are formed as V-shaped slits with a tie strip 146 between the adjacent slots. The vent die blades 132 are constructed as V-shaped members and assembled, in spaced relation, to the vent die plate, as in FIG. 30A, with the material connection 146 between the offset blades 132. The V-shaped vents function as flap-like elements which open readily in thin plastic bags. This construction is also fully described in the copending application No. 4.

As shown in FIG. 28, the several die units for cutting of the segment stack 61 are constructed as separate subassemblies which are bolted to the base die plate 128. Further, the several die units will mount to different base plates for design of different combinations of openings and forming of the bag ends. This allows tailoring of the punch unit 120 for different bag structure to the desire and specification of the customer.

The two machined dies 134 for the finger openings are generally triangular in shape and secured by bolts 147 to the plate, as in FIGS. 28–30. The vent opening die plate 132 is bolted to the plate 128 as at 148 in FIGS. 28–30. The bowtie die blades 129 are secured within its plate and also bolted to the plate 128, as at 149 in FIG. 28.

In one embodiment, the punch unit establishes a pressure of 15,000 pounds per lane for rapid severing of a fifty bag stack 61 within the allotted operating period of each cycle.

The gripper fingers 114 of the trolley unit 110 maintain a firm hold on the stack 61 in the punch unit 120, as shown in FIG. 30, during the punch operation.

Following completion of the punch operation, the severed bag segment stack 61 is positioned by the trolley unit 110 into the bag separation station 63. The tie strips between the bag proper and the waste scrap or slugs and the preferred cold blocking of these slugs within the punch unit maintains the bag segment as a unit for subsequent movement and final separation at the downstream separation station. The bowtie scrap or slug 131 and the finger opening scraps or slugs 140 are separated and removed at the separation station. The removal is such that the tie strips are broken within the stack 61 and allow subsequent removal of the individual bag stacks from within the segment stack 61.

Referring to FIGS. 33–36, inclusive, the separating system at station 63 includes a top section 150 and a bottom section 151. The separation assemblies for each lane are similarly constructed and mounted to the frame structure.

The top section includes three crossbeams 152,152a and 152b spanning all lanes and connected at the opposite ends of the beams to respective hydraulic cylinders 153,153a and 153b at both ends of the beams. The bottom section 151 is similarly formed with three beams 154, 154a and 154b spanning all lanes and connected at the opposite ends to hydraulic cylinders 155, 155a and 155b at both ends of the beams. The beams support like separation elements for holding the bag segments and removing of the slugs 131 and 140, in each lane.

More particularly, the top separation unit 150 includes spaced holding or clamping member 156 and 157 secured to beams 152 and 152b and located to clamp the bag stack 61 immediately outwardly of the finger openings and the retained scrap or slugs 140. A common slug removal unit 158 is mounted between the spaced members 156 and 157. The unit 158 has a common support bar 158a. secured to the top side of the cross beam 152a, as at 158b. Finger opening slug removal members 159 and 160 are secured to the ends of bar 158a and are aligned with the finger opening slugs 140 in the stack 61. Center slug removal members 161 and 161a are secured to the bottom of beam 152a between members 159 and 160 and are located in alignment with the opposite ends of bowtie slug 131 of the stack 61 lying to the opposite sides of the narrow neck of the slug 131.

In the illustrated embodiment, separate air cylinders 153 and 153b of the bank of cylinders are connected to the spaced clamping members 156 and 157 by cross beam 152 and 152a, and are operated in synchronism. The arm 158a is connected to the single center cylinder 153a by a cross beam 152a.

More particularly, clamping members 156 and 157 are resilient heads adapted to engage the stack 61 slightly outwardly of the finger opening slugs 140 during the separation cycle, and in cooperation with like clamping members of the bottom separation unit firmly clamping the stack in place.

The finger slug removal members 159 and 160 are like spring-loaded posts 168 which are mounted in cross bar 158a, as shown most clearly in FIG. 36. In the clamping position of FIG. 38, the members 159 and 160 resiliently engage the slugs 140 with an increasing force as the stack is compressed, as more fully disclosed below.

The two center slug removal members 161 and 161a are connected to the bottom of cross beam 152a. Each member 161 and 161a includes a support shoe affixed as by bolts 162 to the cross beam 152a. A rubber pad 171 is secured to the shoe and offset to the upstream end of the line, as shown in FIGS. 34 and 36a. As shown, the members 161 and 161a are spaced laterally to engage the slug 131 to the opposite sides of the narrow neck portion of the bowtie slug 139.

The cooperating lower separation unit 151 includes similar stack support plates 173 and 174, with opposed spaced edges 175 and 175a (FIGS. 33, 35 and 36). The plates are secured to the beams 154 and 154b and thereby to the end cylinders 155 and 155b at both ends. The spaced plates 173 and 174 form a central opening as wide as the slug 131 in the stack 61. Finger slug openings 176 and 176a in the plates are aligned with the finger slugs 140 in the stack 61. Each plate 173 and 174 is secured to beams 154 and 154b which extend across the machine, with the outer ends secured to and positioned by separate cylinders 155 and 155c. The upstream plate 174 has spaced finger openings or notches 178 and 178a aligned with the gripper fingers 114 of trolley unit 110.

The lower separation unit 151 includes spaced clamping portions 177 and 177a of the plates 173 and 174 aligned with the corresponding top clamp members 156 and 157. Plates 173 and 174 include the openings 176 and 176a aligned with the slug removal members 156 and 157 of the top section 150.

Finger slug removal posts 180 and 180a are secured to the brackets 181 and 181a beneath the plates in alignment with the openings 176 and 176a. Each post includes a spring-loaded guide member 179 and 179a, respectively. The upper end of the guide members are inclined inwardly as at 182 and 182a to the center of the station, and project into the plate openings. Upon closure, the inclined upper end walls direct the removed slugs 140 to a chute 183 and collection location including a cross conveyor 184, or other suitable device.

Two center slug removal members 185 and 185a of the lower unit are aligned with the slug 131 in the stack 61 and the members 161 and 161a of the top unit 150, each member 185 has a reject shoe 186 bolted to the topside of beam 154a, which is secured at the opposite ends to end cylinder units 155a. Reject shoe 186 has a base 189 bolted to the beam and an offset end member 190 located within and above the plate opening. Member 190 is aligned with the breaker shoe 161 of the top unit 161 to separate the slug 131 from the bag stack 61.

Figure 38:
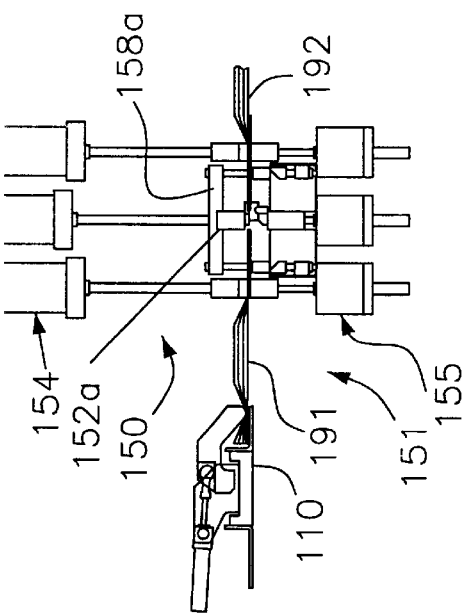
FIG. 38 is a view similar to FIG. 33 with a bag stack being separated into separate bag stacks.

When the cylinder units are actuated, the stack 61 is first clamped in place, as shown in FIG. 38, and the slugs 131 and 140 are loosened and separated from the bags on the stacks 61. The opposed cylinder units 153 and 154 and the opposed cylinder units 152b and 154b are first actuated to clamp the stack 61 in place. The opposed cylinder units 153a and 154a are then actuated to remove the center opening slug 131 and the finger opening slugs 140, as follows.

Figure 39:
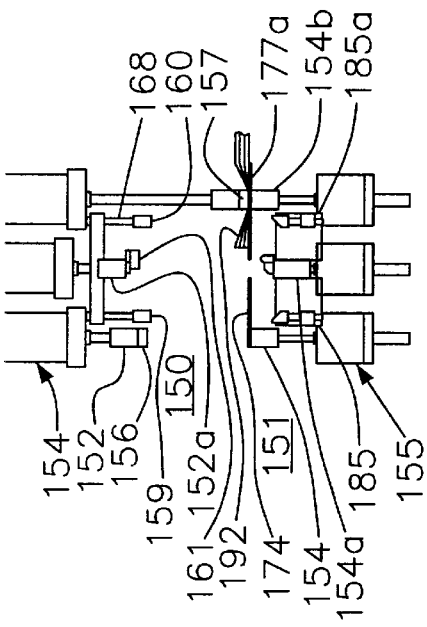
FIG. 39 is a view of separation unit releasing the downstream bag stack of the bag segment stack.
Figure 41:
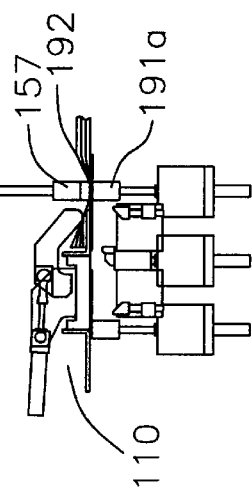
FIG. 41 is a view similar to FIG. 39 with the carriage in position to grasp the upstream bag stack of the bag segment for movement of the upstream separated bag stack.
Figure 40:
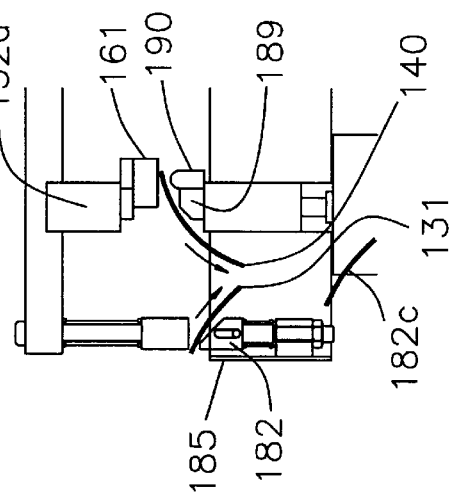
FIG. 40 is an enlarged view illustrating the movement of scrap from within the separation unit.

The downstream clamping members 156 and 179, and the downstream slug removal members 159 and 185 are retracted, as shown in FIG. 39. The slugs 140 of the downstream finger opening and the central slug 131 which form the open end of the bags are released and drop into the waste collection system (FIG. 40). The trolley unit 110 is then operated to withdraw the separated downstream bag stack 191 from the segment stack 61.

The downstream stack 191 is dropped on the index conveyor 64 and the trolley unit 110 returns to the separation unit. The upstream stack 192 is held by the upstream clamping members 157 and 177a, as shown in FIG. 39. The trolley unit 110 moves through the unit to the free end of the upstream bag stack 192, with the fingers open. The bottom trolley plate is located beneath the edge notches 178 and 178a (FIG. 34) in the edge of the upstream support plate 175a of the lower separation unit. The fingers close and grasp the downstream end of the stack 192. The trolley unit 110 moves the upstream bag stack 192 to the index conveyor 64.

After retraction of claim 157, the index conveyor 64 is any suitable construction and is shown as a conventional indexer belt 193 with a switchable motor drive 194 for transfer of the received stacks 22, 191, 192 and all other subsequent bag stacks.

The individual stacks 191 and 192 may be placed on the conveyor belt 190 in a shingled fashion 195, as shown in FIG. 42, or further as multistacks 196 of like or opposite orientation, as shown in FIGS. 43 and 44, for further processing The several sections of the system are controlled in accordance with the time available for necessary forming and stacking the bags. As noted, the web supply section 120 operates in a continuous fixed speed. The section 121 operates in cycles of movement and forming. Within section 121, the creasing and sealing station operates within cycles to form the bag segments and generates the stack 61 at the stacking station and table 94. The punch unit, separation unit and conveyor stacking are operated within the multi-cycle time required to form the total number of bags in bag stack 61.

In one particular application, a bag making machine as illustrated operates at 125 cycles per minute in the formation of the bag segments. The segment stacks are each formed with 50 bags per stack and 2½ stacks are formed each minute. The carriage conveyor and the punch unit and separation unit operate and reset the carriage conveyor at stacking table within 25 seconds. The carriage conveyor operates within its operative cycle during the forming and stacking of the bags to move the bag stack 61 from the stacking table 94 to and through the punch unit 120 and to and through the separation unit 121 with transport and depositing of the bag stacks on the indexing conveyor 64 and returns to the downstream end of the stacking table 94 to pick up the next stack of bags essentially immediately and simultaneously with its formation.

Figure 45:
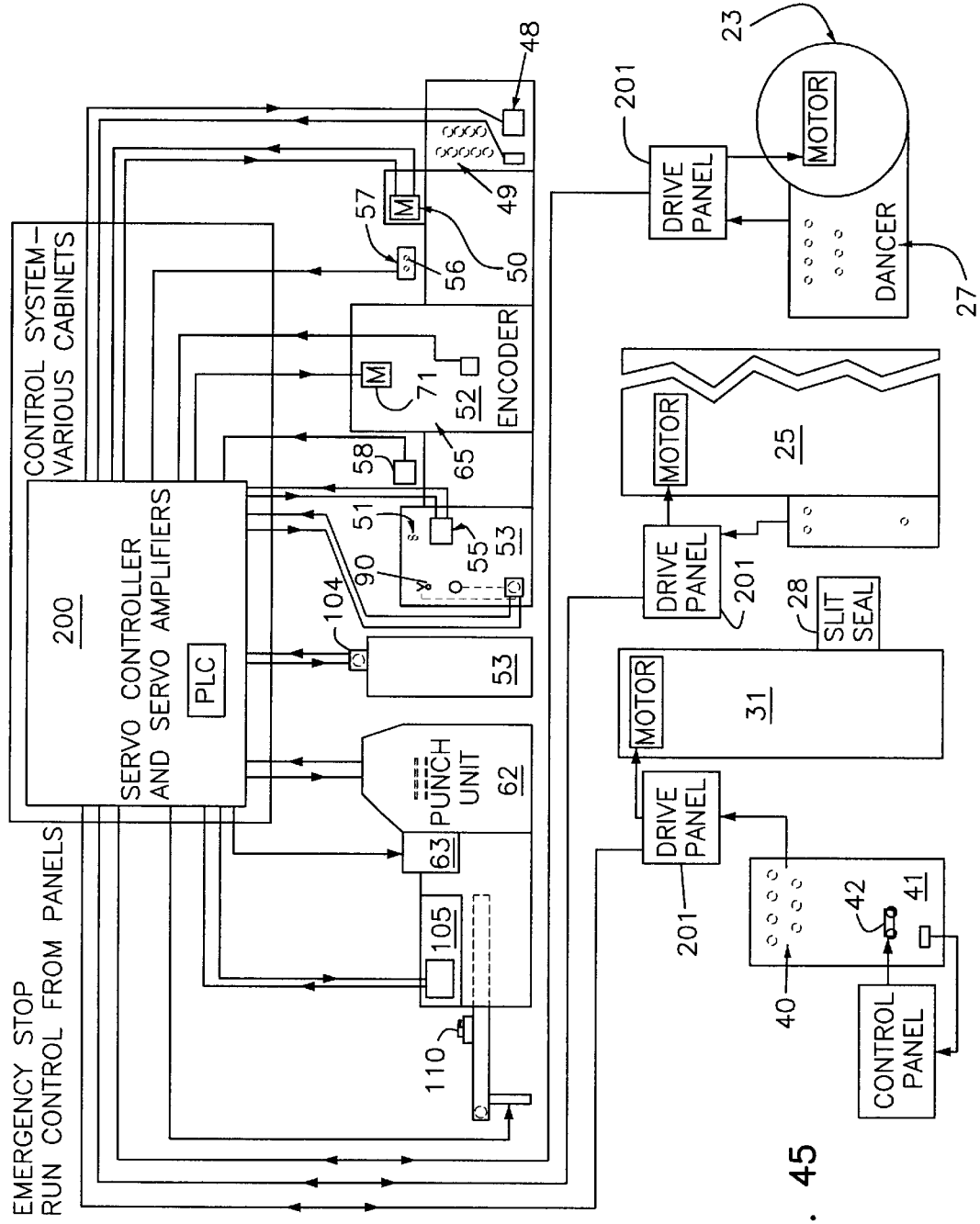
FIG. 45 is a block diagrams illustrating an interrelated control system in the machine.

The machine control system is illustrated in a block diagram in FIGS. 45 and 46. The system includes a control system with the several components resident in a plurality of cabinets. A servo controller 200 with appropriate servo amplifiers is connected to sense the operation status of the several components of the machine including the several units of the web supply section and maintain the continuous web movement and similarly sense the components of the bag forming section, including the bag forming units and the separation unit, and maintain the proper cyclical and related operation of the components therein. A program logic controller resident in the controller 200 controls operation of the relays, air solenoids, hydraulic solenoids and like operational control members and devices.

The several components of the web supply section have individual drive panels 201 which provide connection of the several individual drives and sensors for maintaining the continuous movement of the web through the web supply section 20. The several units in the web supply including the drive rolls and nip rolls with the related dancers and position sensors create the necessary reference output signals connected to the controller 200 for maintaining a smooth, continuous movement of the web 24 from the unwind stand, through the section 20, which will be readily understood by those skilled in the art.

The forming section 21 includes the first portion including stations for forming of the segments and stacking them on the stacking table and the second portion including the punching station, and separation station for forming and placing of the bags on the output conveyor. In section 21, creaser drive motor, the primary and slave draw roll drive motors 54 and 55, the sealer drive motor 92, the flattener drive motor 109 and the carriage drive motor, with the related sensors and encoders, are all connected to the controller 200 and control the cyclical movement of the several components and the movement of the web and segments in proper timed relation through the several stations. In addition, the dancer and sensor associated with the slave draw roll motor sends a signal to the controller to establish the shared load with the primary draw roll drive system. The punch unit and the separation unit include position sensors to actuate the several cylinders for producing the severing of the segment stack to define the bags and the separation of the connected bag stacks within the segments by removal of the connecting slugs or scrap portion.

The diagrammatic illustration is given to describe a generally preferred system for operating the illustrated embodiment of the invention. The detailed control arrangement and required programming can be readily supplied by those skilled in the art with the detailed description of the structure and operation of the components of the illustrated embodiment.

The various process machines are preferably controlled by a computer base controller providing for a cyclical operation. Each cycle includes a transfer period and a process period. During the process section transfer movement ceases and the bag segments are formed at each of the stations.

A suitable computer based control system is readily provided based on the general computer control of other bag making equipment and present day computer technology.

The bag machine is illustrated to disclose a preferred embodiment. The machine may be constructed with other controls and design, including features as disclosed in the cross-referenced applications. The bag stacks may be formed with elements to hold the bags in a stack together with a ready breakaway construction for customer or user removable of one or more bags from a stack. The hinge pattern may be changed with more or less hinge lines depending on the plastic used, the control of film movement and the like. Other creaser and or punch units may be designed to produce the hinge pattern and the severing or other forming of the disclosed open end of the bags of the bag stacks. Even single bags may be formed and then accumulated. The illustrated bag is a particular application useful in marketing of products for transport from the place of sale, such as food and other products and particularly fast food sources where a plurality of small products are assembled and carried by the purchaser. The system may be applied to other plastic bags which may carry a single product and may also include a closed end or specially closed end rather than an open end opposite the flat bottom wall.

The present invention is thus directed to disclosing the method of high speed production of square or flat bottom plastic bags which can be produced as a cost effective plastic bag particularly where a large number of bags are required at low cost; and particularly competitive with current paper bags and other plastic bags.

We claim:

1. A bag making machine for producing stacks of folded flat plastic bags from a tubular gusseted web having a gusset in each side and each bag having a closed bottom end extended across said gusset web and having an inwardly opening V-shaped hinge pattern of creases within each said gusset with the bottom leg of the hinge pattern extending from the bottom end of the bag to the outer gusseted edge of the bag and the upper leg of the crease pattern extending from the bottom leg and outer gusseted edge of the bag to the inner gusset edge, said pattern unfolding the bottom portion of the bag including said hinge pattern and establishing a flat bottom wall upon opening of the folded flat plastic bag, comprising:

a first section including means to form the gusseted flat tubular web into a series of segments each having a length equal to two bags, and comprising a creaser unit to form a W-crease pattern in said gussets of said web at an end seal line extended across said tubular gusseted web and between said adjacent bag segments to form said V-shaped crease pattern adjacent the opposite sides of said seal line, a slit/seal unit configured and operable to form a transverse thin end seal in said web at said end seal line and to sever the center of said seal to form adjacent bottom end seals of adjacent bag segments, and a stacking support configured and operable to receive and assemble said bag segments into a segment stack, a second section located to receive said segment stack and including a separation die on a severing unit aligned with the center of the segment stack and configured for severing a slug portion of said segment stack at the center portion of said segment stack to form bag stacks to the opposite sides of said segment stack and with said slug portion between said bag stacks and defining the open end of the bags in said bag stack, said separation slug portion being formed with a plurality of small interconnections to the adjacent bag stacks and interconnecting the bags in each bag stack to each other at said open ends, a separation unit including clamp units and a slug removal unit, a powered unit connected to said clamp units and a powered unit connected to said slug removal unit and configured to sequentially operate said clamp units and said slug removal unit to form the open ends of the bags in said bag stack without separation of the individual bags in each stack from each other, and a conveyor unit configured to grasp the downstream end of said segment stack at said stacking support and move and hold said segment stack within said severing unit and said separation unit, said conveyor unit configured to move the downstream bag stack from said separation unit and to return and grasp the upstream bag stack and move the upstream bag stack from said separation unit and then return to grasp another segment stack at said stacking support.

2. A bag making machine for producing stacks of folded flat plastic bags from a tubular gusseted web having a gusset in each side and each bag having a closed bottom end extended across said gusset web and having an inwardly opening V-shaped hinge pattern of creases within each said gusset with the bottom leg of the hinge pattern extending from the bottom end of the bag to the outer gusseted edge of the bag and the upper leg of the crease pattern extending from the bottom leg and outer gusseted edge of the bag to the inner gusset edge, said pattern unfolding the bottom portion of the bag including said hinge pattern and establishing a flat bottom wall upon opening of the folded flat plastic bag, comprising:

a first section including means to form the gusseted flat tubular web into a series of segments each having a length equal to two bags, and comprising a creaser unit to form a W-crease pattern in said gussets of said web at an end seal line extended across said tubular gusseted web and between said adjacent bag segments to form said V-shaped crease pattern adjacent the opposite sides of said seal line, a slit/seal unit configured and operable to form a transverse thin end seal in said web at said end seal line and to sever the center of said seal to form adjacent bottom end seals of adjacent bag segments, and a stacking support configured and operable to receive and assemble said bag segments into a segment stack, a second section located to receive said segment stack and including a separation die on a severing unit aligned with the center of the segment stack and configured for severing a portion of said segment stack at the center portion of said segment stack to form bag stacks to the opposite sides of said segment stack, and with said slug portion between said bag stacks, said separation slug portion being formed with a plurality of small interconnections to the adjacent bag stacks, a separation unit including clamp units and a slug removal unit, a powered unit connected to said clamp units and a powered unit connected to said slug removal unit and configured to sequentially operate said clamp units and said slug removal unit, a conveyor unit configured to grasp the downstream end of said segment stack at said stacking support and move and hold said segment stack within said severing unit and said separation unit, said conveyor unit configured to move the downstream bag stack from said separation unit and to return and grasp the upstream bag stack and move the upstream bag stack from said separation unit and then return to grasp another segment stack at said stacking support wherein said bottom end seal is a single small beach without a significant projection from the segment, and said creaser unit including a W-shaped tool including at least two parallel ribs for forming two parallel creases in each leg of said V-shaped crease pattern and with the lower leg at an angle of about 45 degrees to the bottom seal and the upper leg at about 13 degrees from a line parallel to the bottom seal extending from the outer end of the lower leg.

3. The bag making machine of claim 2 wherein said lower leg includes three parallel ribs with the center leg aligned with the inner end on the end seal.

4. The bag making machine of claim 1 wherein said severing unit includes a punch unit having spaced blades severing said segment stack at the center portion of said segment stack to form bag stacks to the opposite sides of said segment stack, said blades having spaced notches to form said plurality of small interconnections of the slug portion to the adjacent bag stack.

5. The bag making machine of claim 4 wherein said separation unit includes a slug removal unit including spaced members located in alignment with spaced portions of said slug, and powered unit moves said spaced members to clamp the slug and move the slug from within the stack and then releases and drops the slug from the segment stack.

6. The apparatus of claim 5 wherein said conveyor unit includes a trolley unit having a base plate located to pass below the segment stacks and a gripping finger for gripping the stack on said plate for moving of said segment stack.

7. A bag making machine for producing stacks of folded flat plastic bags from a tubular gusseted web having a gusset in each side and each bag having a closed bottom end extended across said gusset web and having an inwardly opening V-shaped hinge pattern of creases within each said gusset with the bottom leg of the hinge pattern extending from the bottom end of the bag to the outer gusseted edge of the bag and the upper leg of the crease pattern extending from the bottom leg and outer gusseted edge of the bag to the inner gusset edge, said pattern unfolding the bottom portion of the bag including said hinge pattern and establishing a flat bottom wall upon opening of the folded flat plastic bag, comprising:

a first section including means to form the gusseted flat tubular web into a series of segments each having a length equal to two bags, and comprising a creaser unit to form a W-crease pattern in said gussets of said web at an end seal line extended across said tubular gusseted web and between said adjacent bag segments to form said V-shaped crease pattern adjacent the opposite sides of said seal line, a slit/seal unit configured and operable to form a transverse thin end seal in said web at said end seal line and to sever the center of said seal to form adjacent bottom end seals of adjacent bag segments, and a stacking support configured and operable to receive and assemble said bag segments into a segment stack a second section located to receive said segment stack and including a separation die on a severing unit aligned with the center of the segment stack and configured for severing a portion of said segment stack at the center portion of said segment stack to form bag stacks to the opposite sides of said segment stack, and with said slug portion between said bag stacks, said separation slug portion being formed with a plurality of small interconnections to the adjacent bag stacks, a separation unit including clamp units and a slug removal unit, a powered unit connected to said clamp units and a powered unit connected to said slug removal unit and configured to sequentially operate said clamp units and said slug removal unit, a conveyor unit configured to grasp the downstream end of said segment stack at said stacking support and move and hold said segment stack within said severing unit and said separation unit, said conveyor unit configured to move the downstream bag stack from said separation unit and to return and grasp the upstream bag stack and move the upstream bag stack from said separation unit and then return to grasp another segment stack at said stacking support wherein said bottom end seal is a single small beach without a significant projection from the segment, and wherein said creaser unit for forming said W-creasing pattern includes a W-shaped tool and includes creasing tool members for each said upper leg and for each said bottom leg of each V-shaped pattern, each of said legs having at least two parallel spaced ribs.

8. The machine of claim 7 wherein the upper leg includes a short flat wall extension of said upper leg ribs from the gusset into the bag.

9. The apparatus of claim 8 wherein said flat extension engages the plastic layers inwardly of said gusset without significant thinning of said plastic layers.

10. The apparatus of claim 7 wherein said bottom leg includes at least three ribs and with said web moving system configured to move said web moved in and with the gusset aligned with said ribs located with the central leg engaging a common area at the inner gusset end and the end seal.

11. The apparatus of claim 10 wherein said bottom leg is at an angle of approximately 45 degrees to the end seal and wherein said upper leg is shorter than the bottom leg and is angularly spaced from a horizontal line parallel to the bottom edge of the bag by approximately 13 degrees.

12. The apparatus of claim 7 wherein said creaser unit includes a heating assembly secured to said W-shaped tools to heat the tools, said heating having a maximum temperature below a temperature to convert the interface plastic to a heat seal level and at a temperature level to establish a cold seal connection at said ribs.

13. The apparatus of claim 7 wherein said spaced ribs of said tool member form rectangular offset creases in the folded plastic layers within said gusset portion of said folded bag.

14. A bag making machine for producing stacks of folded flat plastic bags from a tubular gusseted web having a gusset in each side and each bag having a closed bottom end extended across said gusset web and having an inwardly opening V-shaped hinge pattern of creases within each said gusset with the bottom leg of the hinge pattern extending from the bottom end of the bag to the outer gusseted edge of the bag and the upper leg of the crease pattern extending from the bottom leg and outer gusseted edge of the bag to the inner gusset edge, said pattern unfolding the bottom portion of the bag including said hinge pattern and establishing a flat bottom wall upon opening of the folded flat plastic bag, comprising:

a first section including means to form the gusseted flat tubular web into a series of segments each having a length equal to two bags, and comprising a creaser unit to form a W-crease pattern in said gussets of said web at an end seal line extended across said tubular gusseted web and between said adjacent bag segments to form said V-shaped crease pattern adjacent the opposite sides of said seal line, a slit/seal unit configured and operable to form a transverse thin end seal in said web at said end seal line and to sever the center of said seal to form adjacent bottom end seals of adjacent bag segments, and a stacking support configured and operable to receive and assemble said bag segments into a segment stack, a second section located to receive said segment stack and including a separation die on a severing unit aligned with the center of the segment stack and configured for severing a slug portion of said segment stack at the center portion of said segment stack to form bag stacks to the opposite sides of said segment stack and with said slug portion between said bag stacks, said separation slug portion being formed with a plurality of small interconnections to the adjacent bag stacks, a separation unit including clamp units and a slug removal unit, a powered unit connected to said clamp units and a powered unit connected to said slug removal unit and configured to sequentially operate said clamp units and said slug removal unit, and a conveyor unit configured to grasp the downstream end of said segment stack at said stacking support and move and hold said segment stack within said severing unit and said separation unit, said conveyor unit configured to move the downstream bag stack from said separation unit and to return and grasp the upstream bag stack and move the upstream bag stack from said separation unit and then return to grasp another segment stack at said stacking support, wherein each creaser unit includes a fixed upper tool assembly forming said W-crease pattern and a lower movable platen assembly.

15. The apparatus of claim 14 wherein said movable platen assembly including an upper soft surface within which said tool assembly enters and forms said crease pattern.

16. The apparatus of claim 15 including a hydraulic unit for moving said platen assembly.

17. A bag making machine for producing stacks of folded flat plastic bags from a tubular gusseted web having a gusset in each side and each bag having a closed bottom end extended across said gusset web and having an inwardly opening V-shaped hinge pattern of creases within each said gusset with the bottom leg of the hinge pattern extending from the bottom end of the bag to the outer gusseted edge of the bag and the upper leg of the crease pattern extending from the bottom leg and outer gusseted edge of the bag to the inner gusset edge, said pattern unfolding the bottom portion of the bag including said hinge pattern and establishing a flat bottom wall upon opening of the folded flat plastic bag, comprising:

a first section including means to form the gusseted flat tubular web into a series of segments each having a length equal to two bags, and comprising a creaser unit to form a W-crease pattern in said gussets of said web at an end seal line extended across said tubular gusseted web and between said adjacent bag segments to form said V-shaped crease pattern adjacent the opposite sides of said seal line, a slit/seal unit configured and operable to form a transverse thin end seal in said web at said end seal line and to sever the center of said seal to form adjacent bottom end seals of adjacent bag segments, and a stacking support configured and operable to receive and assemble said bag segments into a segment stack, a second section located to receive said segment stack and including a separation die on a severing unit aligned with the center of the segment stack and configured for severing a slug portion of said segment stack at the center portion of said segment stack to form bag stacks to the opposite sides of said segment stack and with said slug portion between said bag stacks, said separation slug portion being formed with a plurality of small interconnections to the adjacent bag stacks, a separation unit including clamp units and a slug removal unit, a powered unit connected to said clamp units and a powered unit connected to said slug removal unit and configured to sequentially operate said clamp units and said slug removal unit, and a conveyor unit configured to grasp the downstream end of said segment stack at said stacking support and move and hold said segment stack within said severing unit and said separation unit, said conveyor unit configured to move the downstream bag stack from said separation unit and to return and grasp the upstream bag stack and move the upstream bag stack from said separation unit and then return to grasp another segment stack at said stacking support wherein said W-shaped creasing tool has a pair of parallel tool members forming each said V-shaped crease pattern with an apex at the outer edge of the segment and at least two parallel crease members extending at an angle from the outer side edge of the segment toward the central portion of the segment, and at least three said parallel crease members extending from the outer side edge of the segment to the end seal of the segment within the gusset portion.

18. The apparatus of claim 17 wherein said crease members are rectangular ribs having a width of substantially 0.030 inches and said ribs are spaced by substantially 0.060 inches.

19. The apparatus of claim 17 wherein said two parallel creases end substantially at the edge of side gusset and having a flat continuance from the outer end of the creases slightly inwardly of the side gusset without significant thinning of the plastic web.

20. The apparatus of claim 1 wherein said slit/seal unit includes a cutting blade having a tapered cutting edge, and a backing roll for supporting the web within the unit, a heating unit connected to said blade to heat said cutting edge and configured to rapidly and momentarily cut the bag segments and heat the opposite edges thereof and thereby form an end seal on each of the adjacent bag segments.

21. The apparatus of claim 20 wherein said backing roll is rotatably mounted beneath said bag segment in alignment with said cutting edge, and a means rotates the roll and presents a new surface for each cutting movement of said cutting edge.

22. The bag making machine of claim 1 wherein said tubular gusseted web includes imprinted material on said web in each lane with the material to be located in predetermined orientation on each plastic web and said material including a location mark identifying the location of the material on said web, said first section including a scanner located for detecting said location mark and locating said web within said first section to locate the creaser unit and slit/seal unit in identical relation to said material in all lane and in all sequentially formed segments.

* * * * *

UNITED STATES PATENT AND TRADEMARK OFFICE
CERTIFICATE OF CORRECTION

PATENT NO. : 6,254,521 B1  Page 1 of 1
DATED : July 3, 2001
INVENTOR(S) : Donald J. Pansier et al.

It is certified that error appears in the above-identified patent and that said Letters Patent is hereby corrected as shown below:

Column 30, claim 2,
Line 20, delete "beach" and insert -- bead --.

Column 31, claim 7,
Line 323, delete "beach" and insert -- bead --.

Signed and Sealed this

Twelfth Day of March, 2002

Attest:

Attesting Officer

JAMES E. ROGAN
Director of the United States Patent and Trademark Office